(12) United States Patent
Nagasaki et al.

(10) Patent No.: US 10,714,989 B2
(45) Date of Patent: Jul. 14, 2020

(54) CLAW POLE TYPE MOTOR AND HOME APPLIANCE INCLUDING SAME

(71) Applicant: Samsung Electronics Co., Ltd., Suwon-si (KR)

(72) Inventors: Yasumasa Nagasaki, Yokohamashi (JP); Yukinori Nakagawa, Yokohamashi (JP); Yasuyuki Sonoda, Yokohamashi (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 502 days.

(21) Appl. No.: 15/527,615

(22) PCT Filed: Nov. 26, 2015

(86) PCT No.: PCT/KR2015/012778
§ 371 (c)(1),
(2) Date: May 17, 2017

(87) PCT Pub. No.: WO2016/085268
PCT Pub. Date: Jun. 2, 2016

(65) Prior Publication Data
US 2017/0366052 A1    Dec. 21, 2017

(30) Foreign Application Priority Data

Nov. 26, 2014  (JP) .................................. 2014-238675
Nov. 28, 2014  (JP) .................................. 2014-241449
(Continued)

(51) Int. Cl.
*H02K 1/14*      (2006.01)
*H02K 3/32*      (2006.01)
(Continued)

(52) U.S. Cl.
CPC ............ *H02K 1/145* (2013.01); *F25B 31/026* (2013.01); *H02K 1/2786* (2013.01); *H02K 3/18* (2013.01); *H02K 3/325* (2013.01); *H02K 21/227* (2013.01)

(58) Field of Classification Search
CPC ............ H02K 1/14; H02K 1/27; H02K 1/145; H02K 3/325; H02K 21/227; H02K 3/18; H02K 1/2786; F25B 31/02; F25B 31/026
See application file for complete search history.

(56) References Cited

U.S. PATENT DOCUMENTS 3,508,091 A * 4/1970 Kavanaugh .......... H02K 21/145
                                                    310/49.11
3,783,313 A * 1/1974 Mathur .................. H02K 37/02
                                                    310/49.19
(Continued)

FOREIGN PATENT DOCUMENTS

CN       202759364        2/2013
JP       2008-167615      7/2008
(Continued)

OTHER PUBLICATIONS

Chinese Office Action dated Oct. 9, 2018 in corresponding Chinese Patent Application No. 201580064490.4.
(Continued)

*Primary Examiner* — Alfonso Perez Borroto
*Assistant Examiner* — Leda T Pham
(74) *Attorney, Agent, or Firm* — Staas & Halsey LLP

(57) ABSTRACT

Disclosed is a home appliance including a claw pole type motor, the claw pole type motor include a first core including a first core main body disposed on a rotary shaft, a first elongation portion disposed in the center portion of the first core main body and extending in the axial line direction of the rotary shaft, and a plurality of first claw poles disposed in the edge portion of the first core main body and extending
(Continued)

in the axial line direction of the rotary shaft and a second core including a second core main body disposed on the rotary shaft, and a plurality of second claw poles disposed in the edge portion of the second core main body and extending in the axial line direction of the rotary shaft and a third core including a third core main body disposed on the rotary shaft, a second elongation portion disposed in the center portion of the third core main body and extending in the axial line direction of the rotary shaft, and a plurality of third claw poles disposed in the edge portion of the third core main body and extending in the axial line direction of the rotary shaft, wherein the second core further comprises a surrounding member disposed in the center portion of the second core main body and surrounding the first elongation portion and the second elongation portion.

20 Claims, 21 Drawing Sheets

(30) Foreign Application Priority Data

Dec. 9, 2014 (JP) ................................ 2014-248723
Dec. 11, 2014 (JP) ................................ 2014-250575
Feb. 26, 2015 (JP) ................................ 2015-037471
Nov. 26, 2015 (KR) ........................ 10-2015-0166073

(51) Int. Cl.
*H02K 3/18* (2006.01)
*H02K 21/22* (2006.01)
*F25B 31/02* (2006.01)
*H02K 1/27* (2006.01)

(56) References Cited

U.S. PATENT DOCUMENTS

| | | | | |
|---|---|---|---|---|
| 6,166,470 A | * | 12/2000 | Miyazawa | H02K 1/145 310/181 |
| 6,538,357 B2 | * | 3/2003 | Horng | H02K 1/145 310/216.092 |
| 7,205,697 B2 | * | 4/2007 | Rhyu | H02K 1/145 310/257 |
| 7,687,961 B2 | * | 3/2010 | Takahashi | H02K 1/20 310/179 |
| 2008/0074009 A1 | | 3/2008 | Enomoto et al. | |

FOREIGN PATENT DOCUMENTS

| | | |
|---|---|---|
| JP | 2009-50159 | 3/2009 |
| JP | 2011-259532 | 12/2011 |
| WO | WO 2004/008605 A1 | 1/2004 |

OTHER PUBLICATIONS

International Search Report dated Apr. 8, 2016 in corresponding International Application No. PCT/KR2015/012778.
Written Opinion of the International Searching Authority, PCT/ISA/237, dated Apr. 8, 2016 in corresponding International Application No. PCT/KR2015/012778.
Chinese Office Action dated Mar. 5, 2019 issued in corresponding Chinese Patent Application No. 201580064490.4.

* cited by examiner

[Fig. 1]
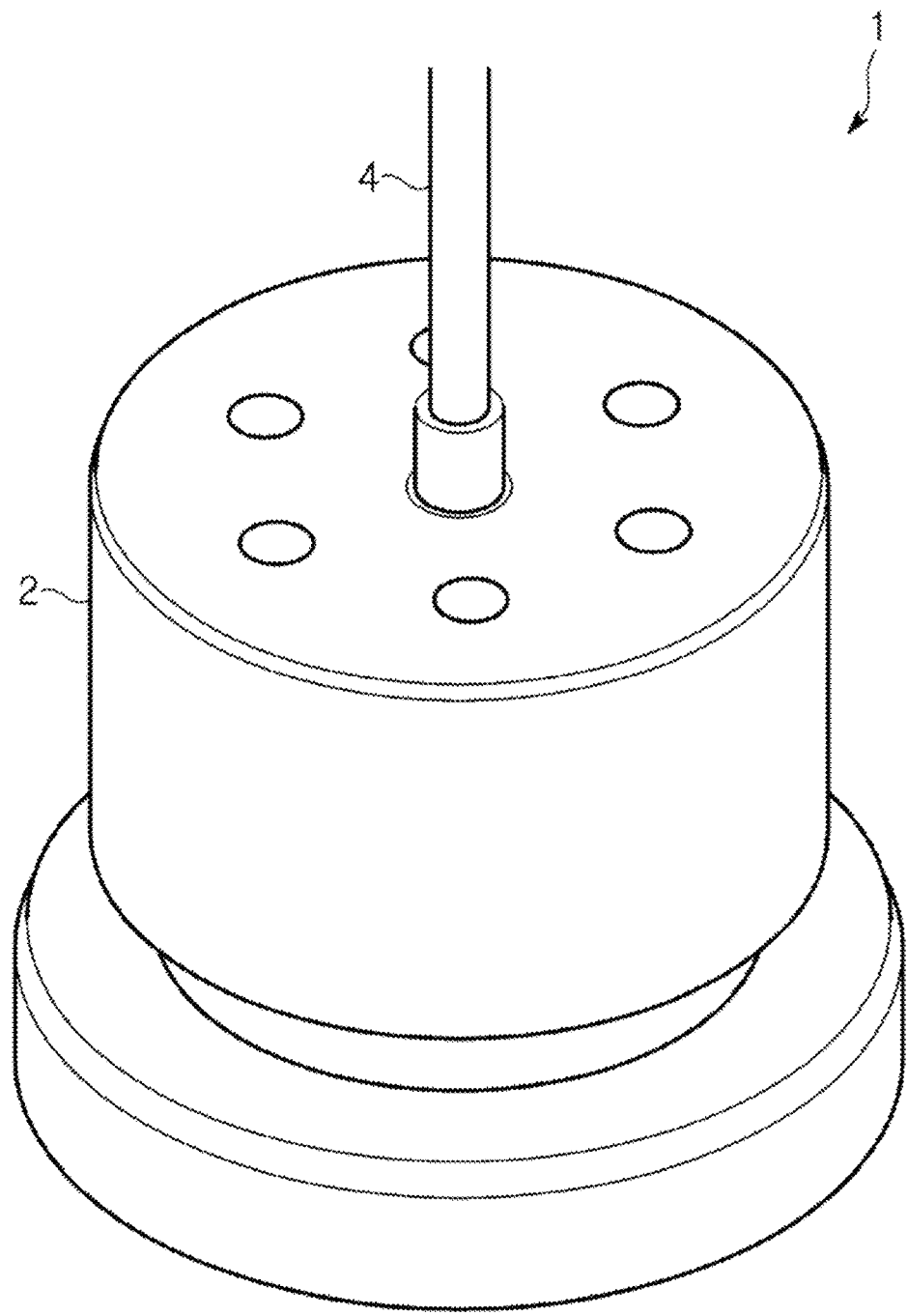

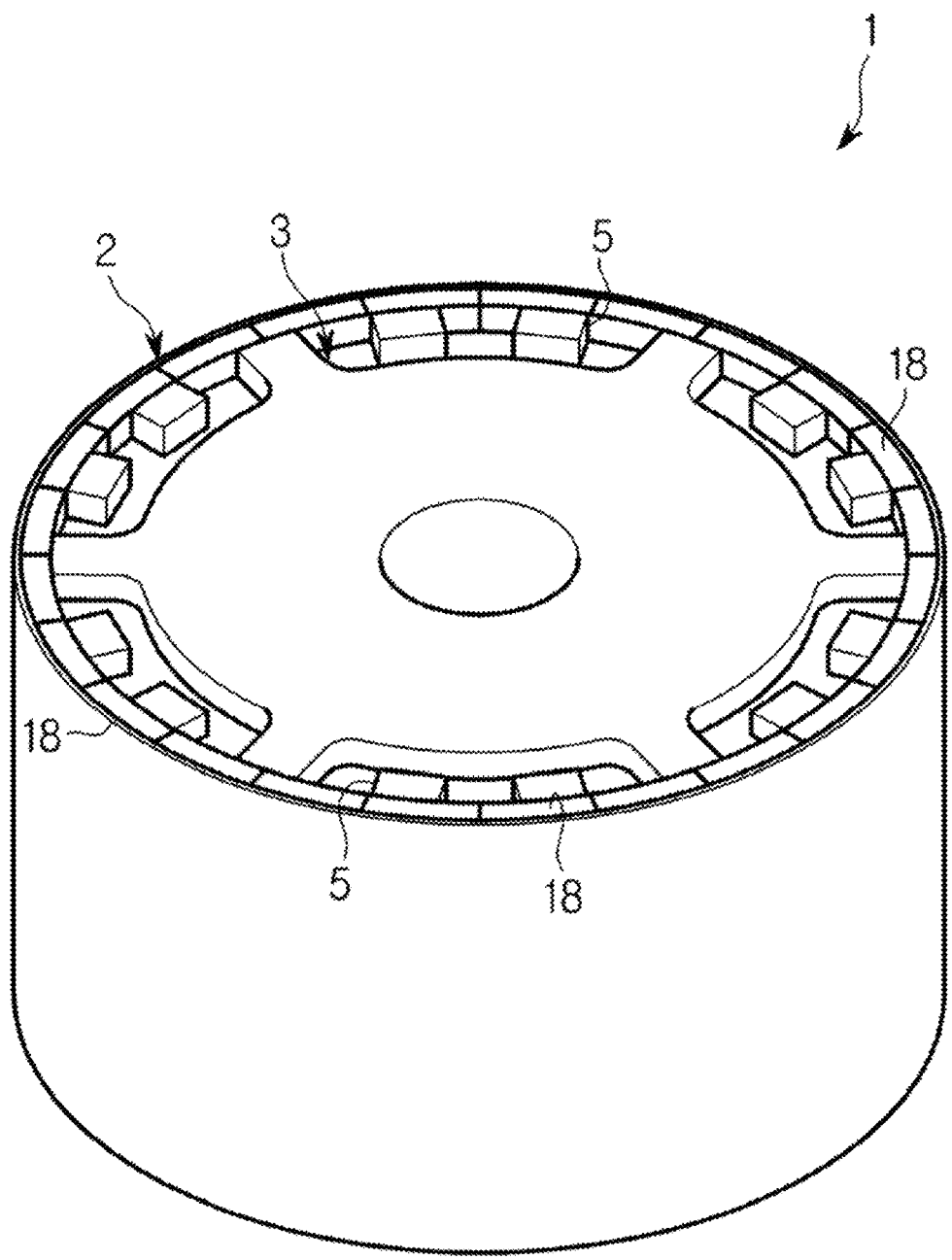
[Fig. 2]

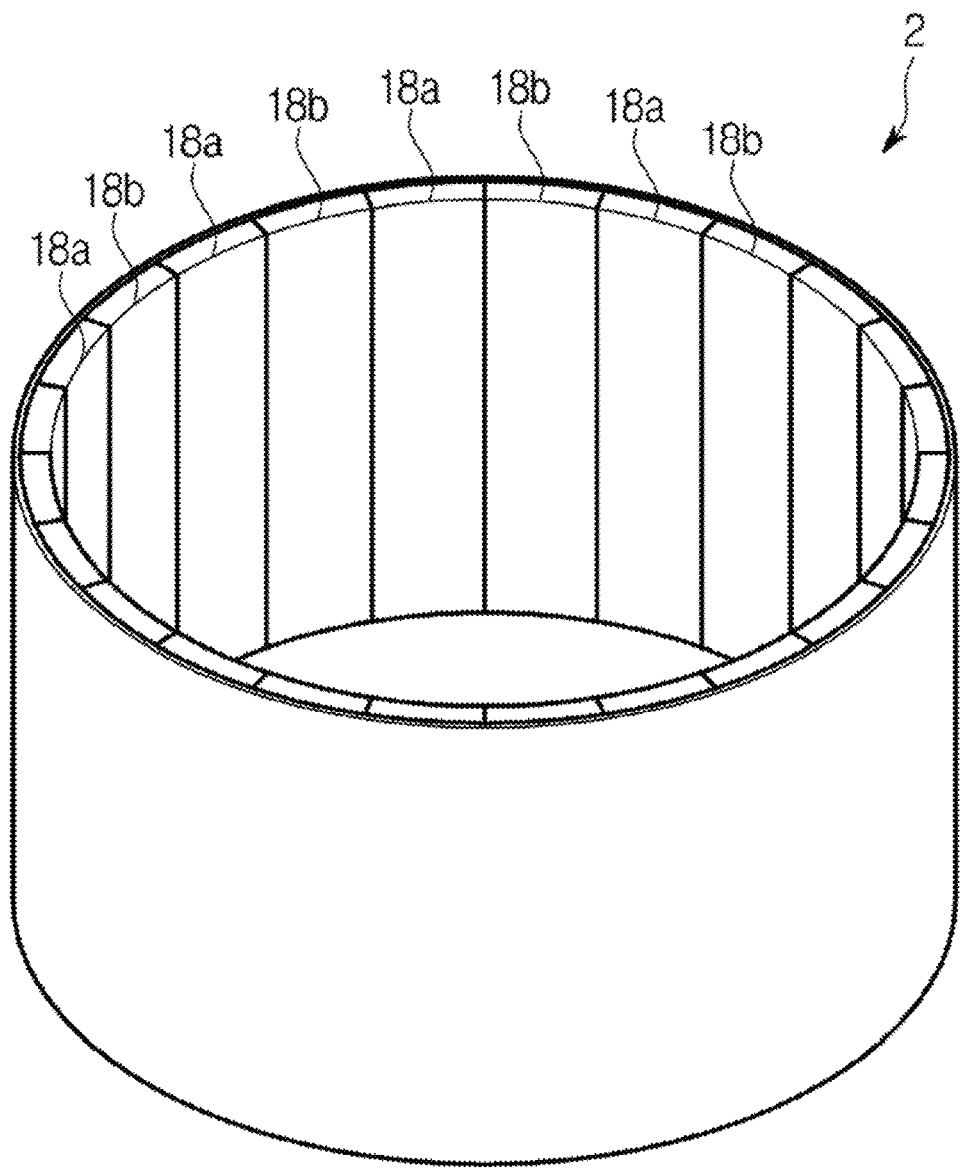
[Fig. 3]

[Fig. 4]
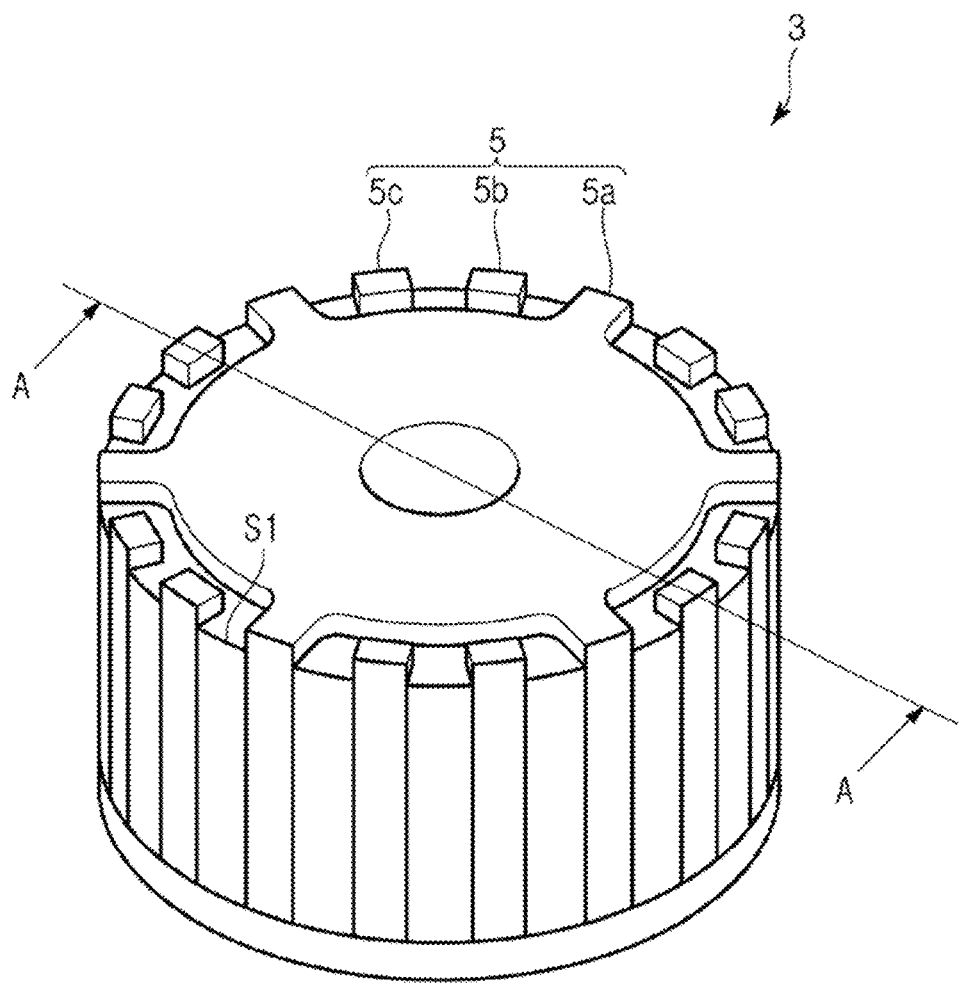

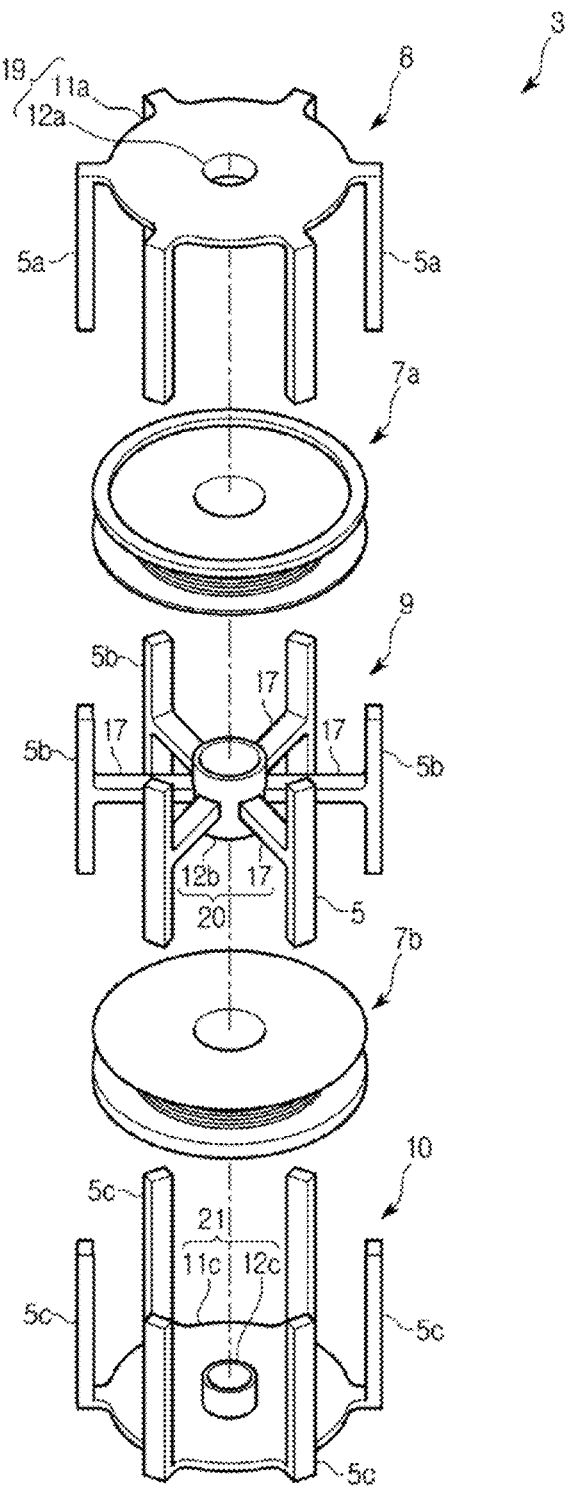
[Fig. 5]

[Fig. 6]
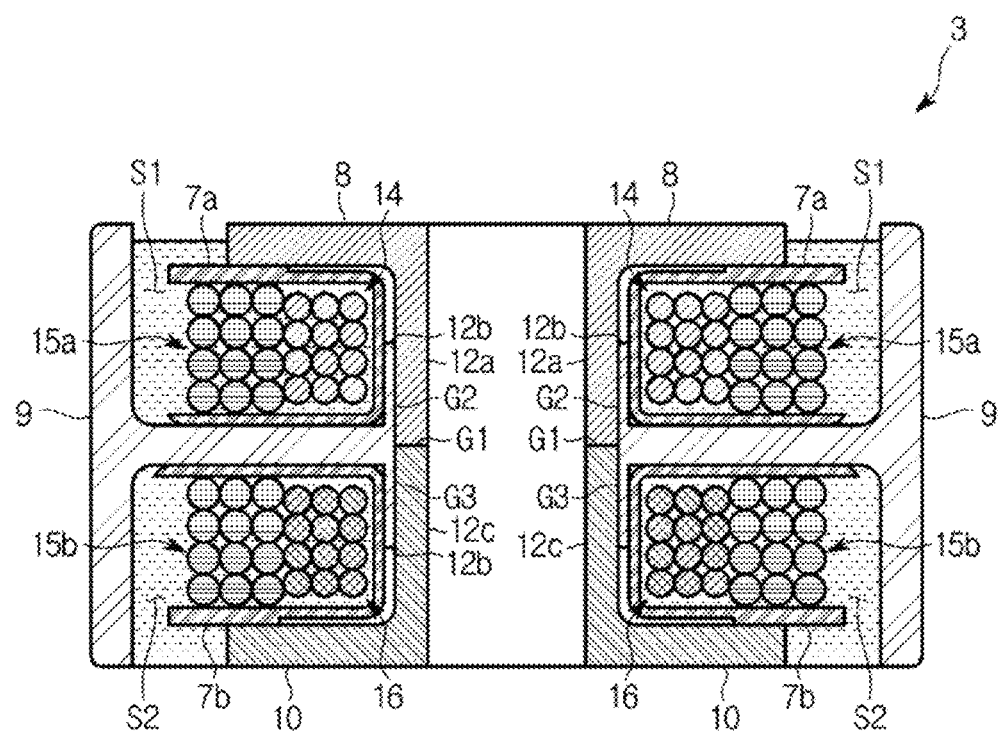

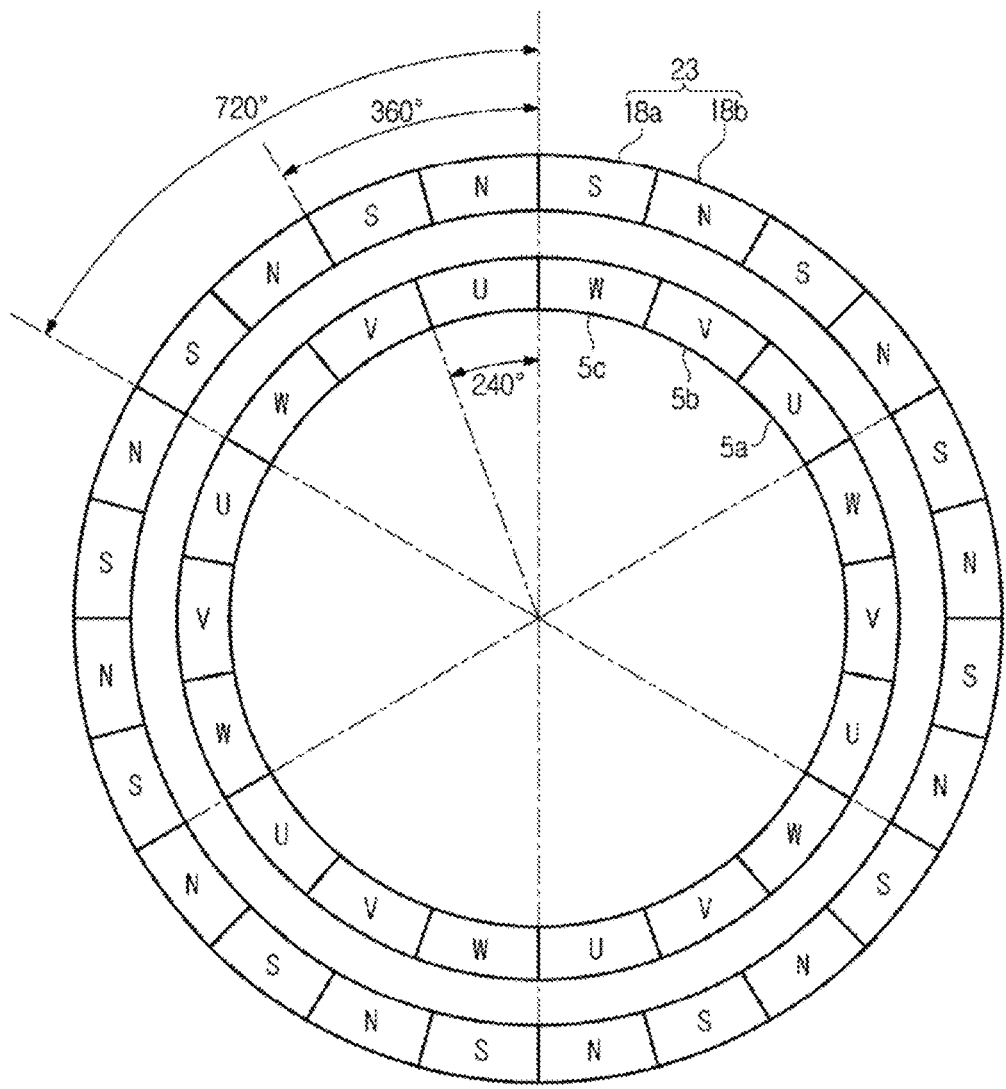
[Fig. 7]

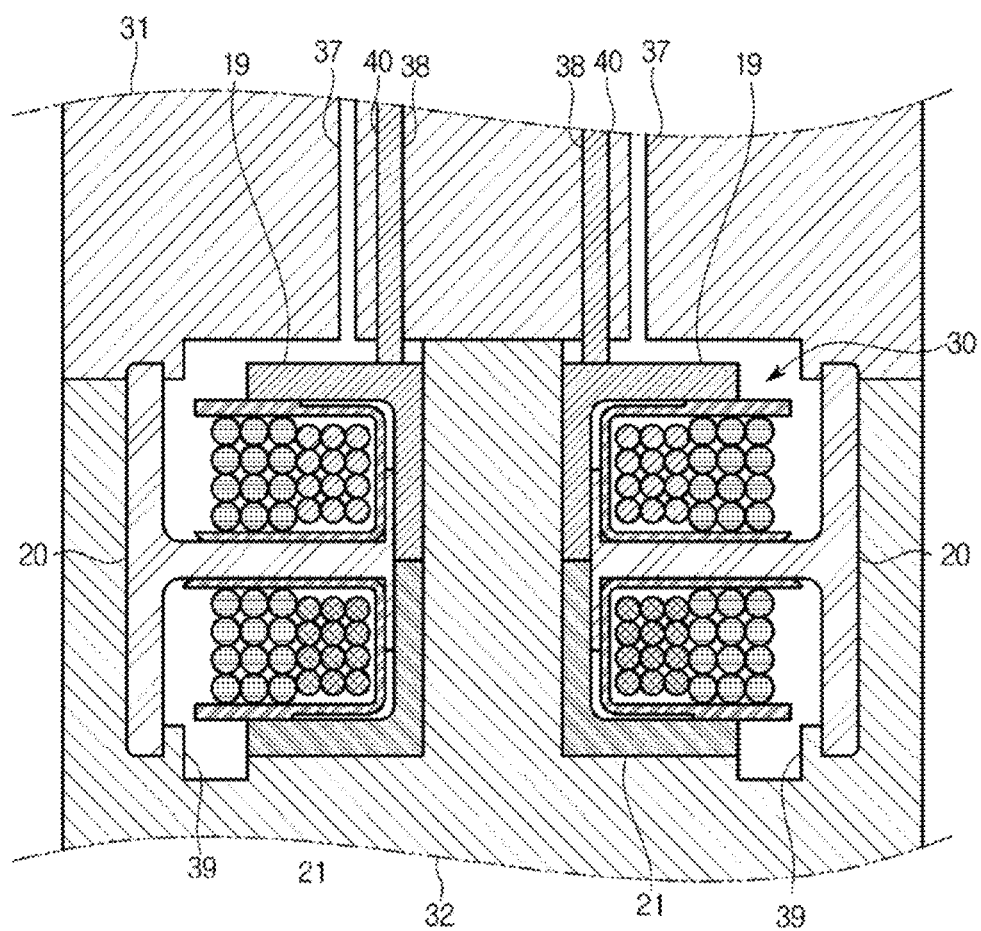
[Fig. 8]

[Fig. 9]
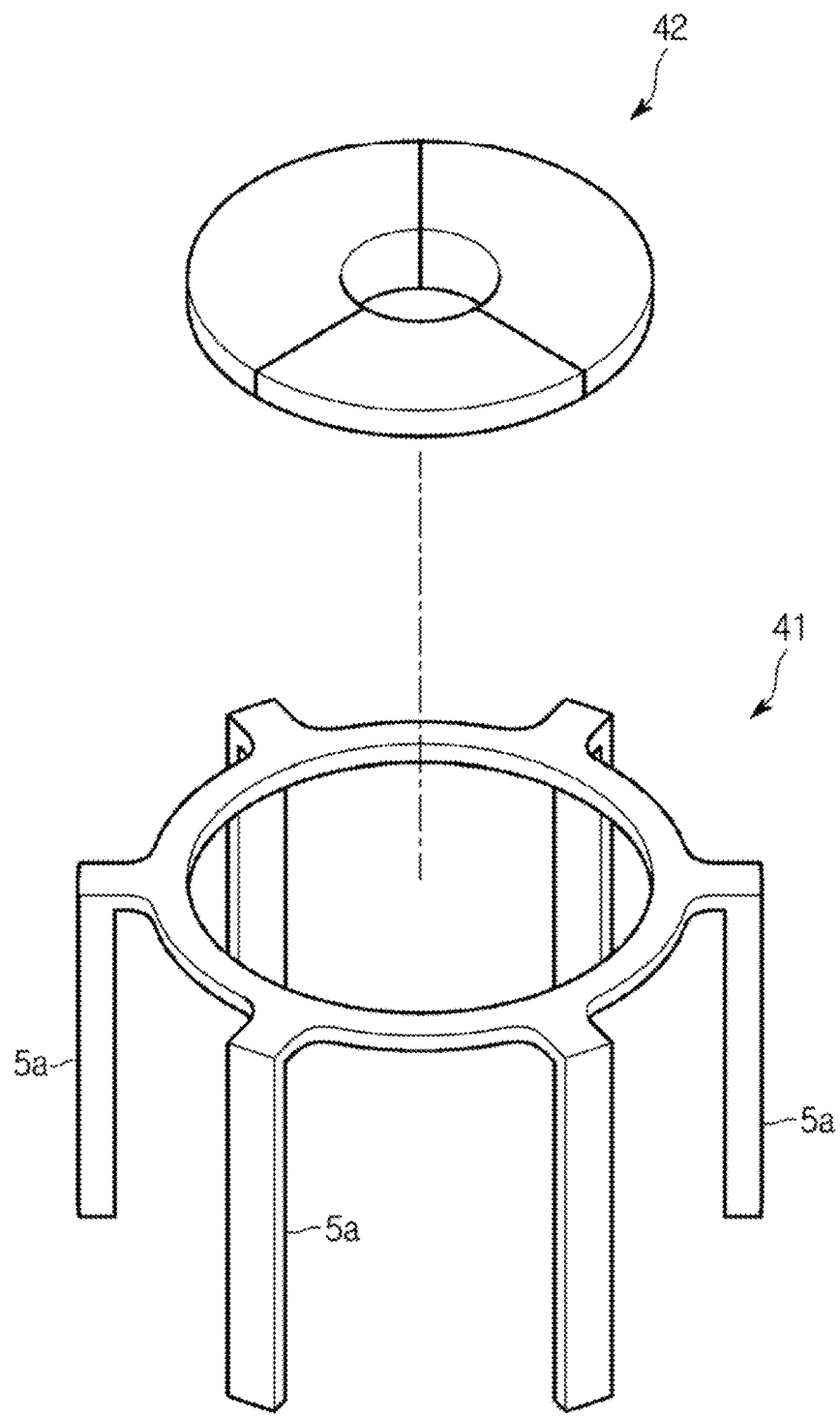

[Fig. 10]
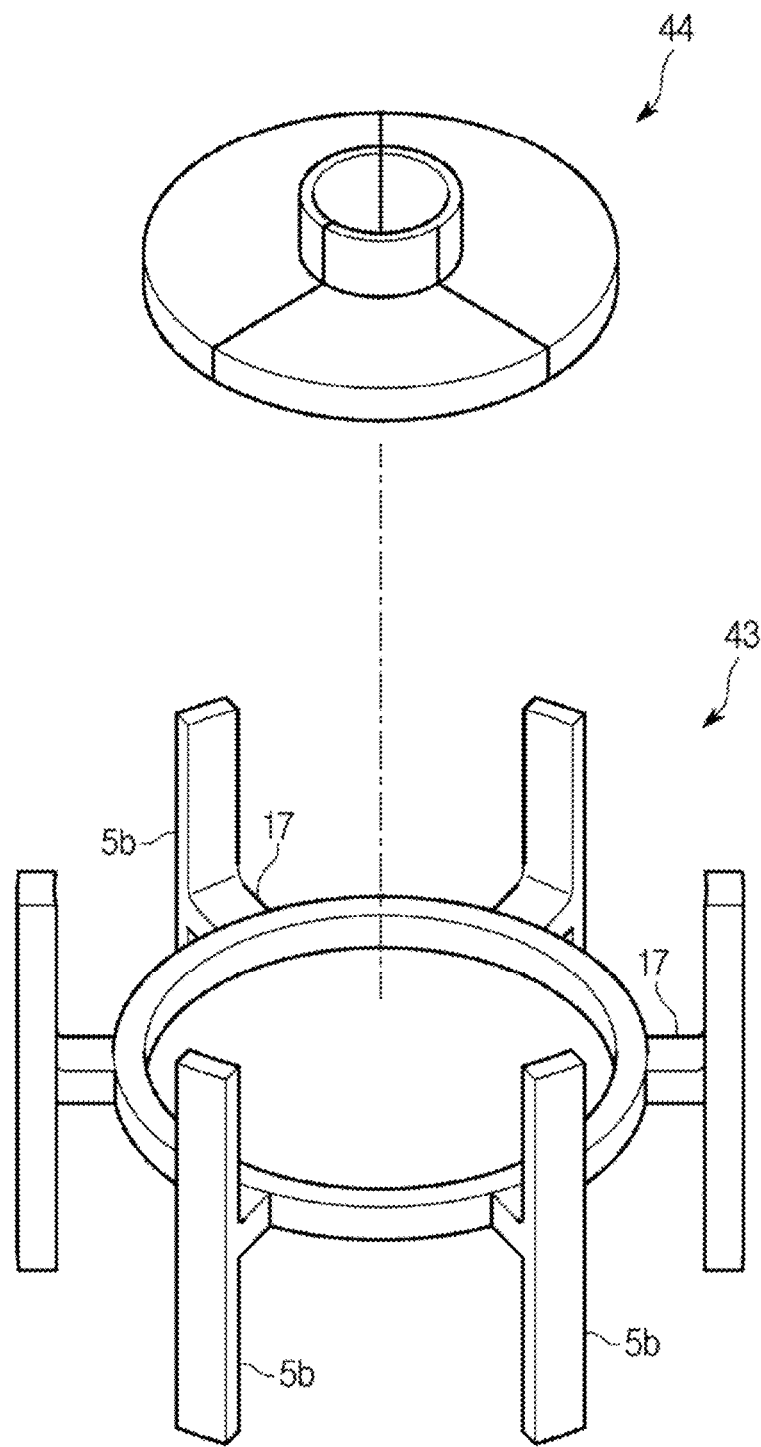

[Fig. 11]
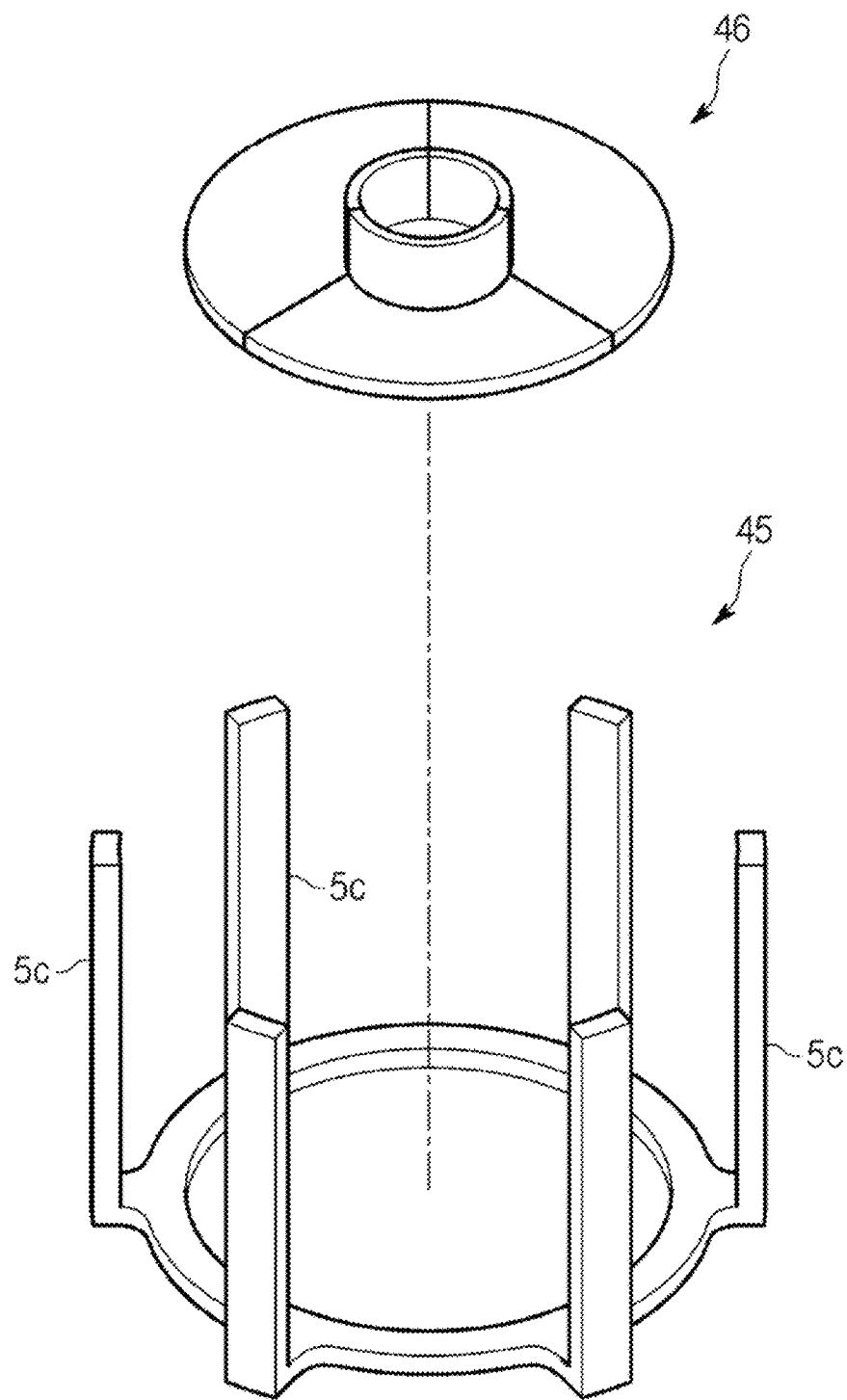

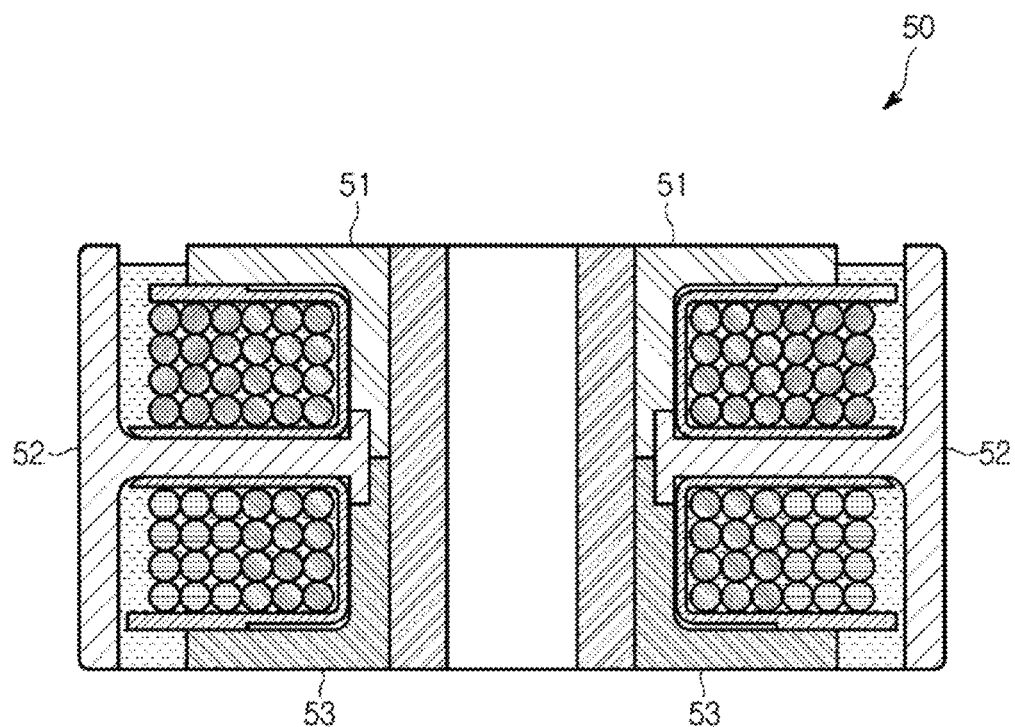
[Fig. 12]

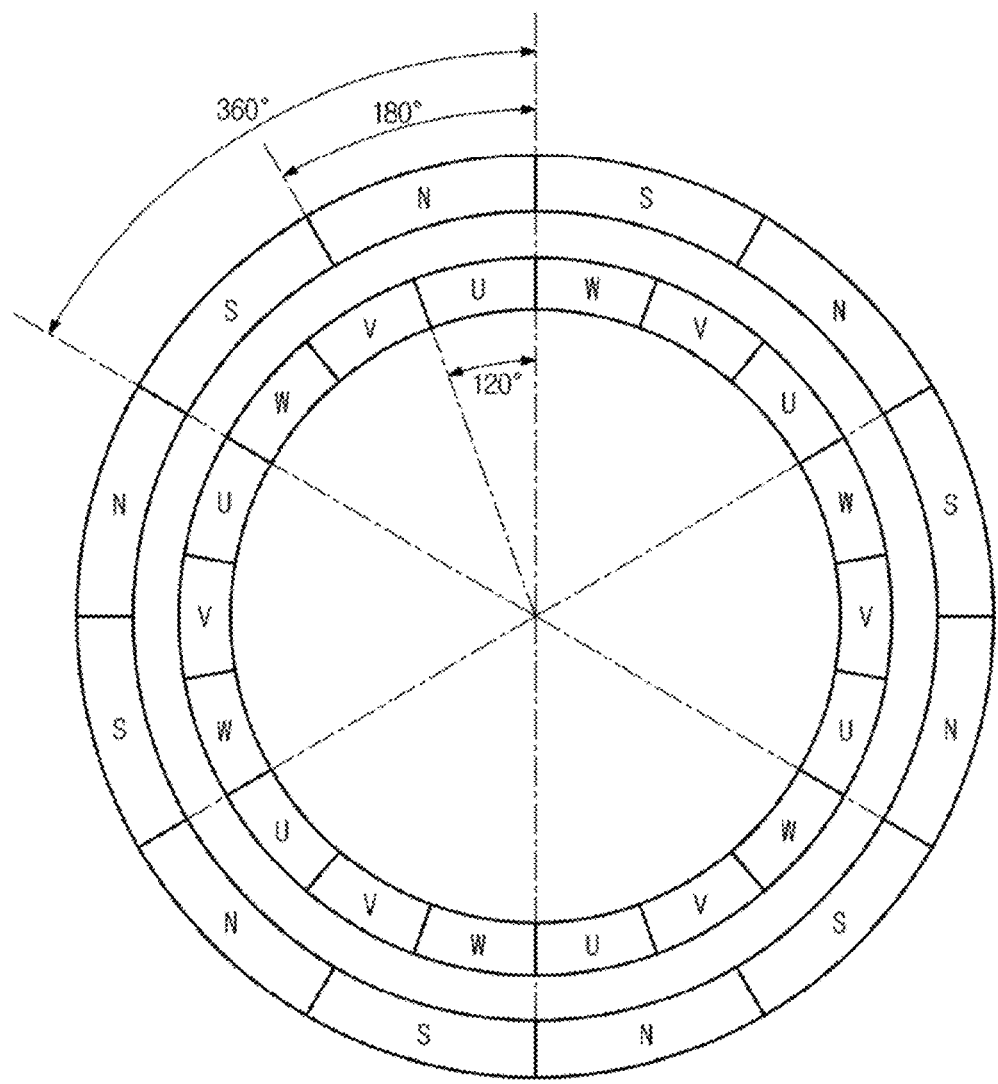
[Fig. 13]

[Fig. 14]
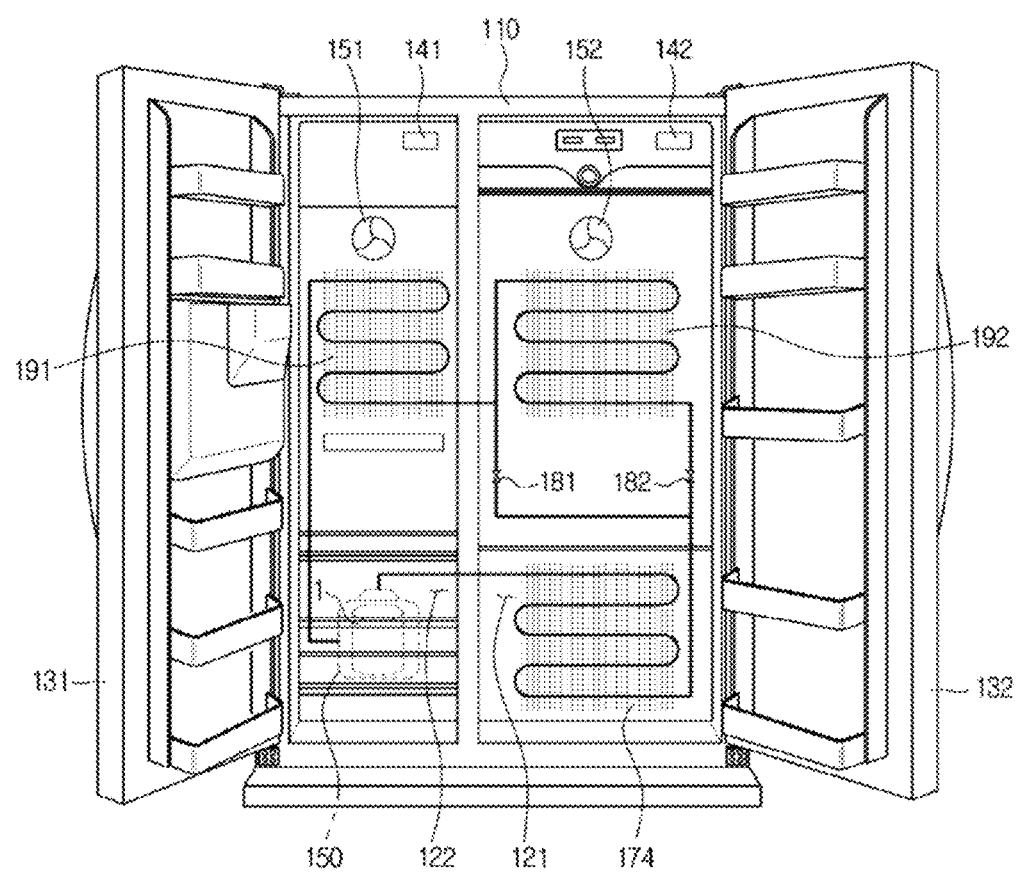

[Fig. 15]
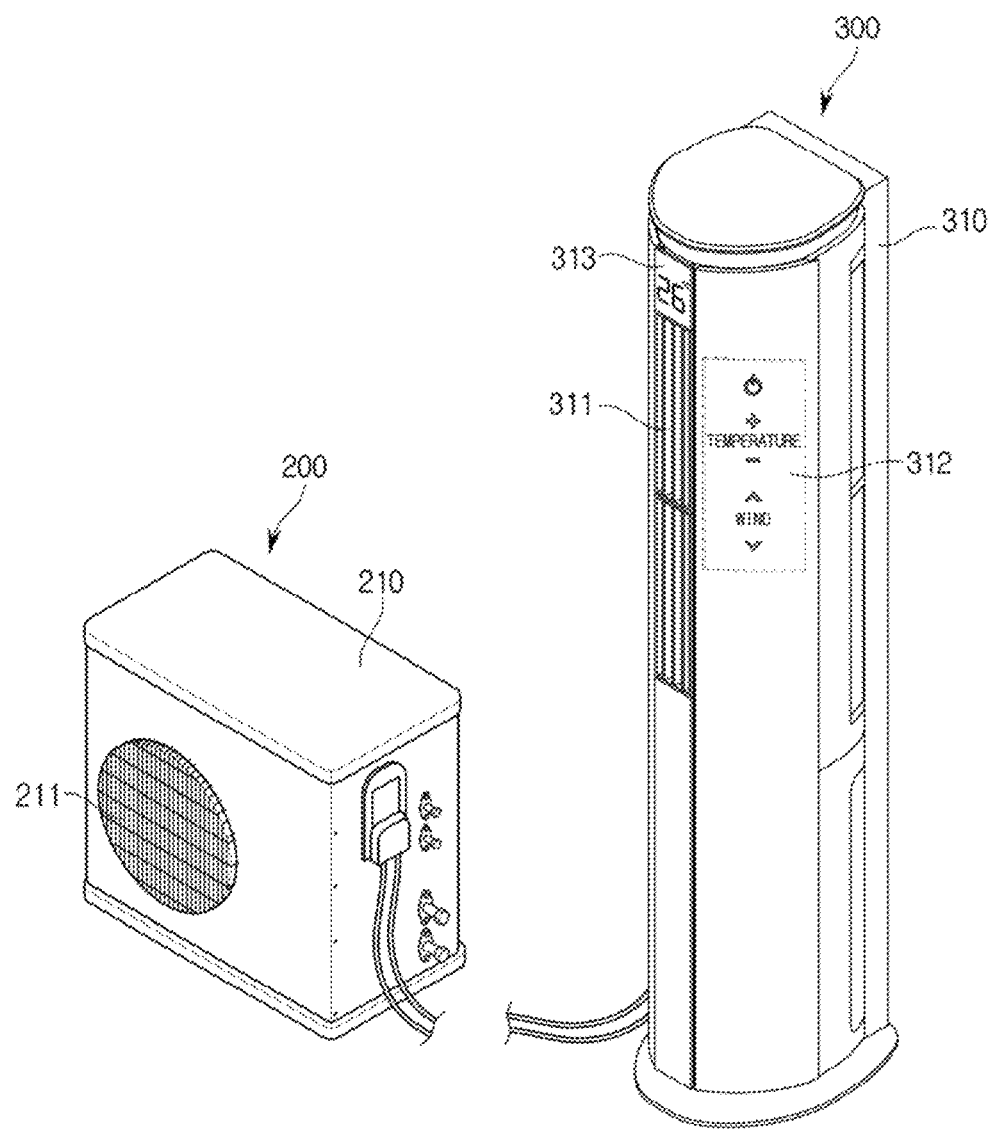

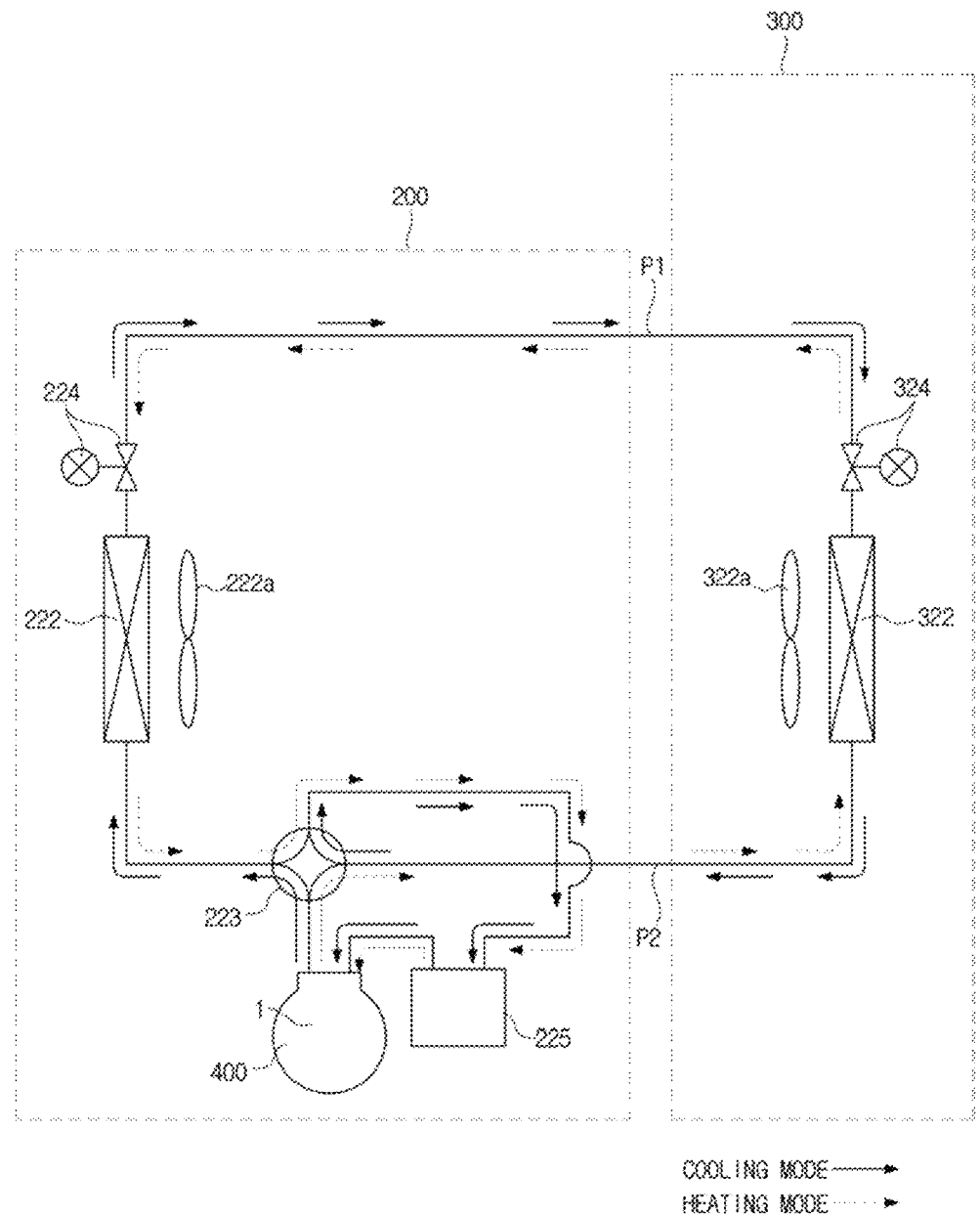
[Fig. 16]

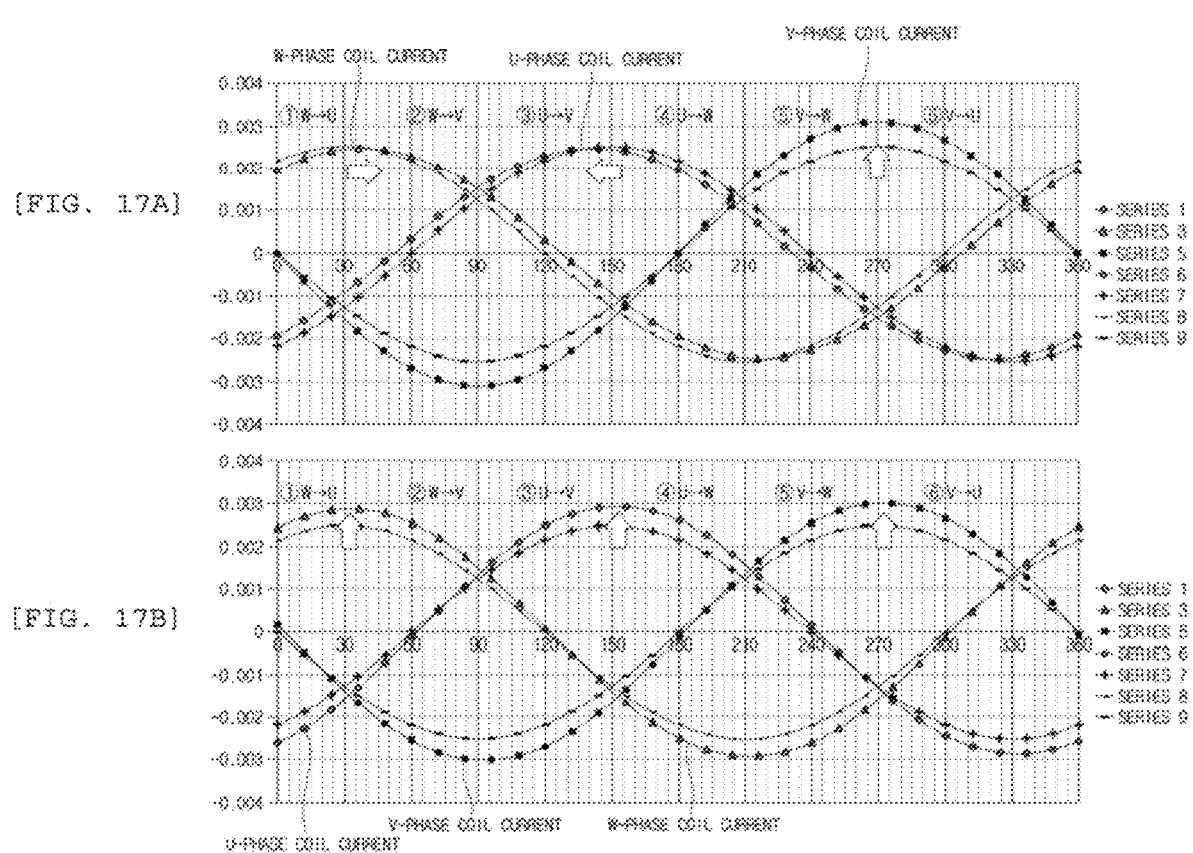
[FIG. 17A]
[FIG. 17B]

[Fig. 18]
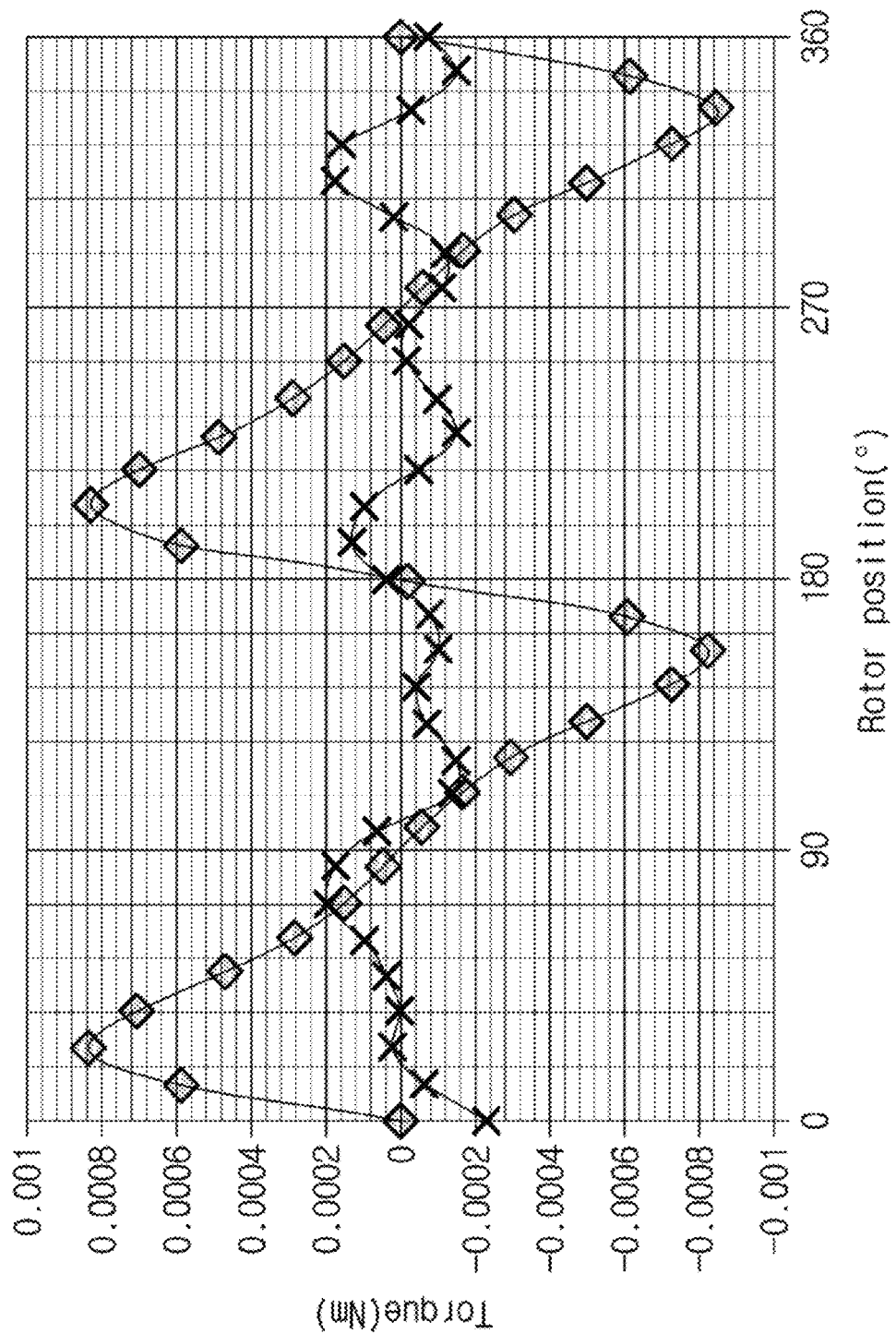

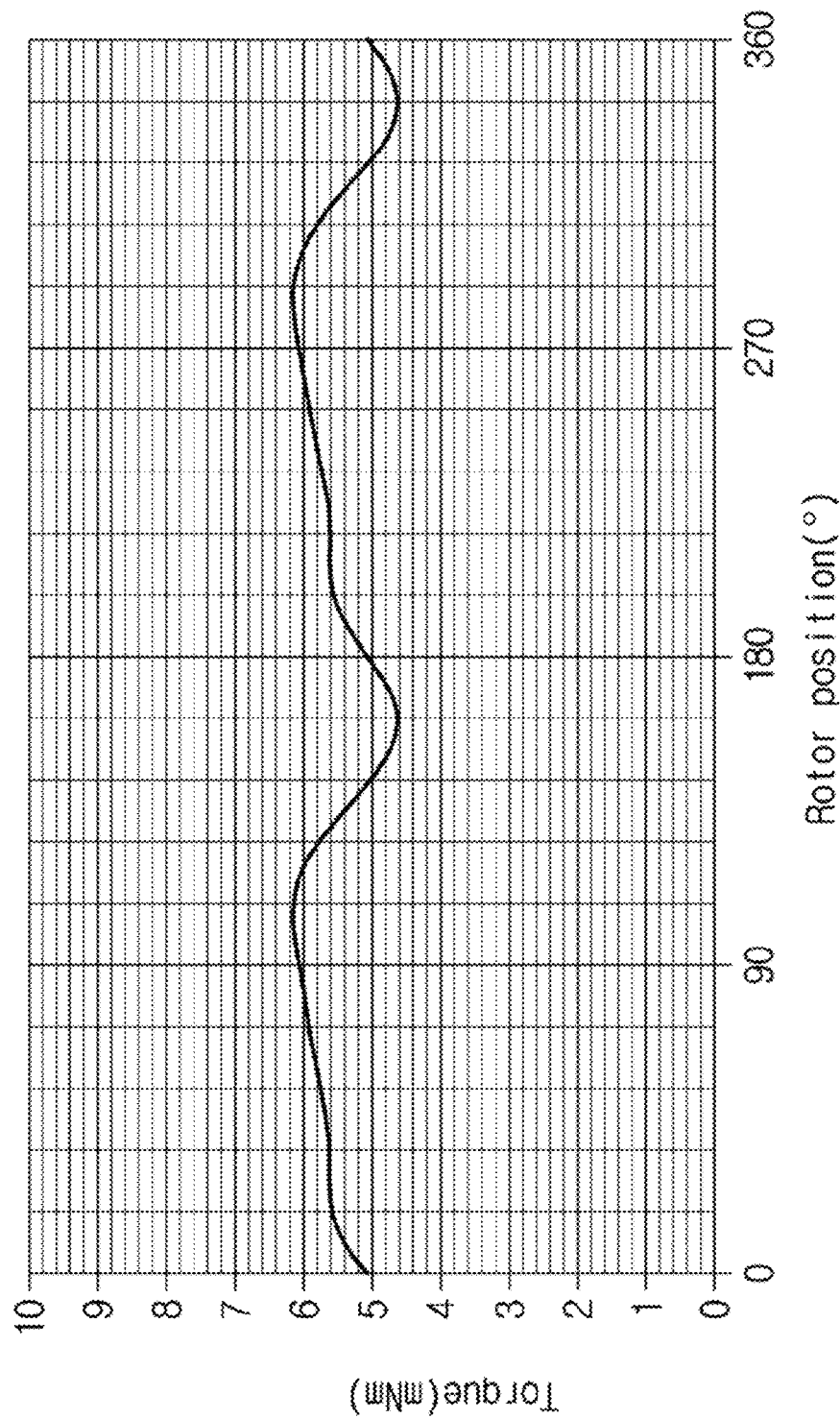
[Fig. 19]

[Fig. 20]
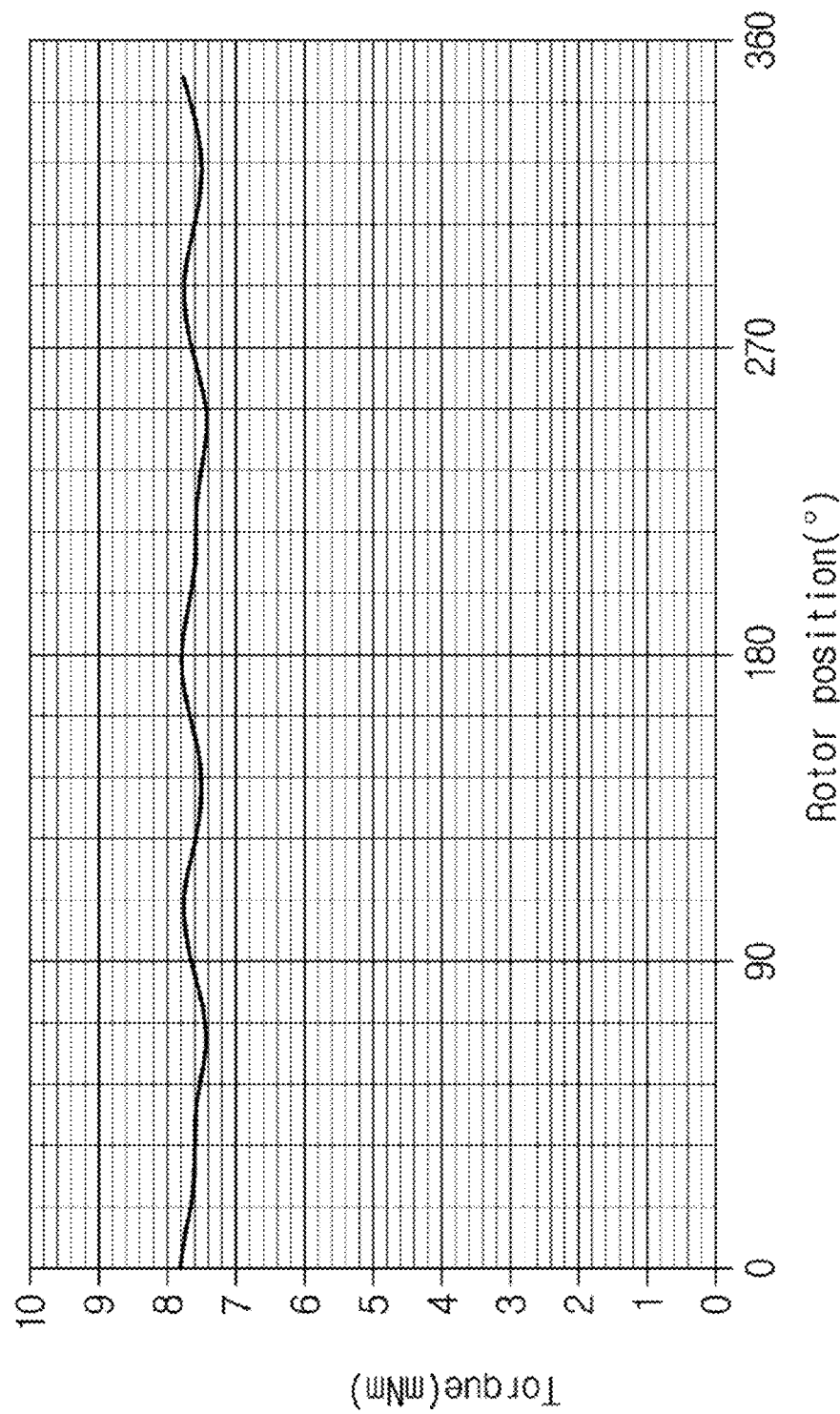

[Fig. 21]
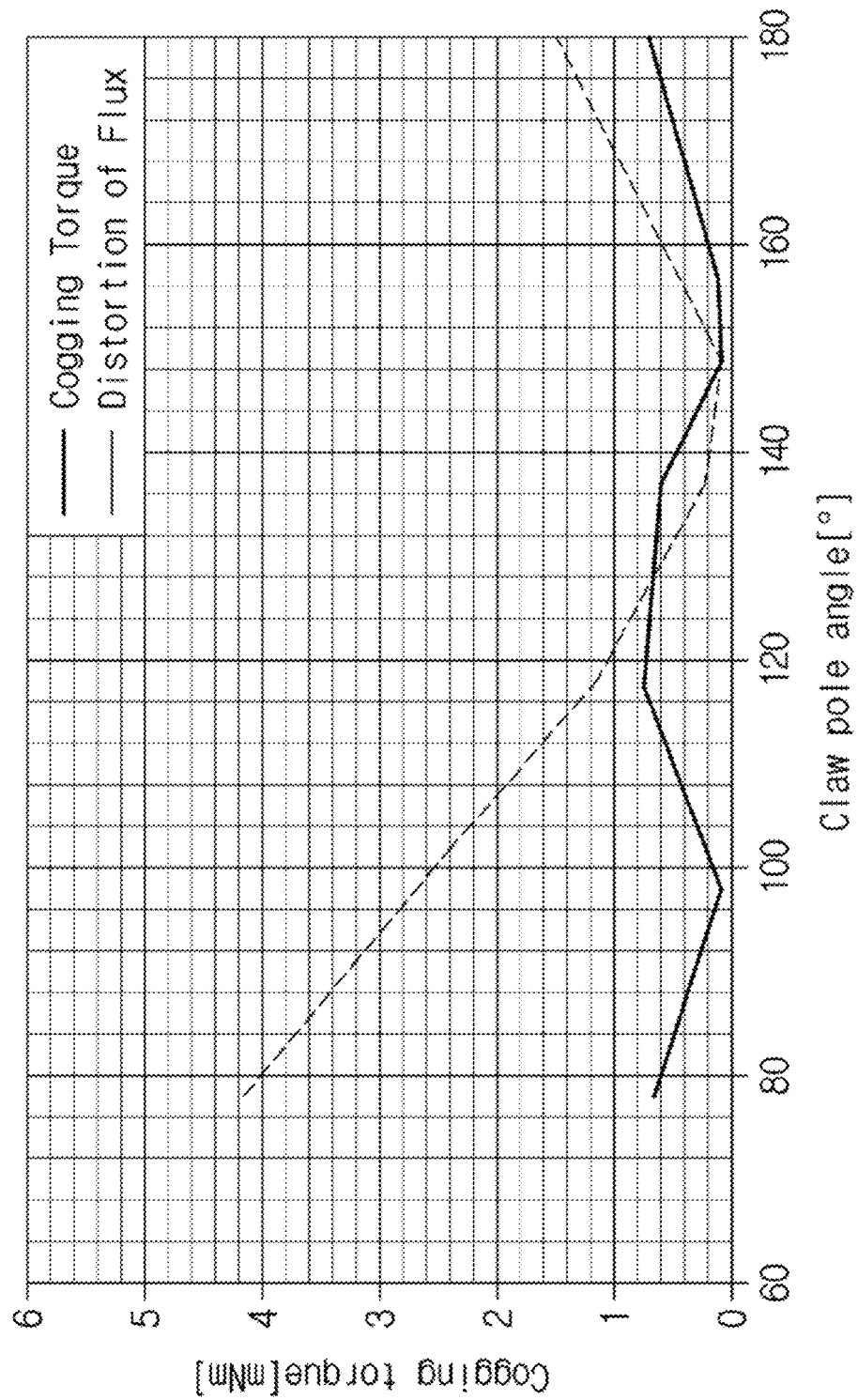

CLAW POLE TYPE MOTOR AND HOME APPLIANCE INCLUDING SAME

CROSS-REFERENCE TO RELATED APPLICATIONS

This application is a U.S. National Stage Application, which claims the benefit under 35 U.S.C. § 371 of PCT International Patent Application No. PCT/KR2015/012778, Nov. 26, 2015, which claims the foreign priority benefit under 35 U.S.C. § 119 of Japanese Patent Application No. 2014-238675, filed Nov. 26, 2014, Japanese Patent Application No. 2014-241449, filed Nov. 28, 2014, Japanese Patent Application No. 2014-248723, filed Dec. 9, 2014, Japanese Patent Application No. 2014-250575, filed Dec. 11, 2014, Japanese Patent Application No. 2015-037471, filed Feb. 26, 2015, and Korean Patent Application No. 10-2015-0166073, filed Nov. 26, 2015, the contents of which are incorporated herein by reference.

TECHNICAL FIELD

The present invention relates claw pole type motor used in various fields, such as a refrigerator and a vehicle, a method of manufacturing the claw pole type motor, and a home appliance including the claw pole type motor.

BACKGROUND ART

A claw pole type motor is a motor including a stator in which a plurality of claw poles extending in the axial line direction of a rotary shaft are arranged along the circumference, and a rotor in which a plurality of permanent magnets are arranged along the circumference, wherein the motor rotates the rotor using an attractive force and a repulsive force generated between the claw poles and the permanent magnets by changing the polarities of the claw poles. A representative claw pole type motor is disclosed in Patent Document 1.

The stator includes a U-phase core including a U-phase core main body in which a plurality of U-phase claw poles(ok?) are arranged at equidistant intervals along the circumference, a V-phase core including a V-phase core main body in which a plurality of V-phase claw poles are arranged at equidistant intervals along the circumference, a W-phase core including a W-phase core main body in which a plurality of W-phase claw poles are arranged at equidistant intervals along the circumference, a U-phase coil to magnetize the U-phase claw poles, a V-phase coil to magnetize the V-phase claw poles, and a W-phase coil to magnetize the W-phase claw poles.

The U-phase core main body includes a first elongation portion extending toward the W-phase core, the V-phase core main body includes a second elongation portion extending toward the U-phase core and the W-phase core, and the W-phase core main body includes a third elongation portion extending toward the U-phase core. The V-phase core is positioned between the U-phase core and the W-phase core, and the V-phase core, the U-phase core, and the W-phase core are arranged in the axial line direction of the rotary shaft.

In the motor configured as described above, a UV gap may be made between the fore-end surface of the first elongation portion and the fore-end surface of the second elongation portion extending toward the U-phase core, due to fabrication errors. Also, a VW gap may be made between the fore-end surface of the second elongation portion extending toward the W-phase core and the fore-end surface of the third elongation portion, due to fabrication errors. It is preferable that the first elongation portion contacts the second elongation portion, and the second elongation portion contacts the third elongation portion, however, in many cases, gaps are made between the first elongation portion and the second elongation portion and between the second elongation portion and the third elongation portion, due to fabrication errors and assembly tolerances.

If a magnetic flux is generated by current flowing through the U-phase coil, the V-phase coil, or the W-phase coil, the magnetic flux passes through the U-phase core main body, the V-phase core main body, and the W-phase core main body to magnetize the U-phase claw poles, the V-phase claw poles, and the W-phase claw poles. At this time, the magnetic flux passing between the U-phase core main body and the V-phase core main body, and the magnetic flux passing between the V-phase core main body and the W-phase core rain body pass between the first elongation portion and the second elongation portion or between the second elongation portion and the third elongation portion. Accordingly, the magnetic flux passes through any one of the UV gap and the VW gap.

The magnetic flux passing between the U-phase core main body and the W-phase core main body passes between the first elongation portion and the second elongation portion and between the second elongation portion and the third elongation portion, since the V-phase core is positioned between the U-phase core main body and the W-phase core main body. Accordingly, the magnetic flux passes through both the UV gap and the VW gap.

However, since air gaps are formed in the UV gap and the VW gap, and the permeability of air is greatly different from the permeability of iron forming the cores, the UV gap and the VW gap act as magnetic resistance.

Accordingly, the magnetic resistance of the magnetic flux passing through both the UV gap and the VW gap becomes greater than that of the magnetic flux passing through any one of the UV gap and the VW gap, and accordingly, a total amount of magnetic flux decreases so that distortion occurs in the amount of magnetic flux for magnetizing the claw poles. As such, if distortion occurs in the amount of magnetic flux, the rotation of the motor is interfered, resulting in vibration or noise of the motor.

If the motor is configured with the U-phase core, the V-phase core, and the W-phase core, first space is formed between the U-phase core main body and the V-phase core main body, and second space is formed between the V-phase core main body and the W-phase core main body. The U-phase coil, the V-phase coil, and the W-phase coil are disposed in the space formed in the insides of the cores, and the V-phase coil is divided into two V-phase coil elements connected in series to each other.

In this state, the U-phase coil and one of the V-phase coil elements are disposed in the first space, and the other one of the V-phase coil elements and the W-phase coil are disposed in the second space. In this case, since the coils can be disposed in the insides of the cores, the motor can be miniaturized.

In the motor configured as described above, a supply voltage is applied to the individual coils to make current flow through the coils and generate magnetic fluxes around the coils, so that the magnetic fluxes pass through the individual core main bodies to magnetize the claw poles. If the winding directions of the coils are different, the magnetic fluxes are generated in different directions, so that the polarities of the claw poles change. Accordingly, by differentiating the winding directions of the U-phase coil, the V-phase coil, and the W-phase coil, and sequentially change the coil to which the supply voltage is applied, the polarities of the claw poles can change appropriately.

Amounts of magnetic flux to magnetize the claw poles of the U-phase core and the W-phase core may be the same as amounts of magnetic flux generated in the U-phase coil and the W-phase coil, respectively.

Meanwhile, an amount of magnetic flux to magnetize the claw poles of the V-phase core may be a sum of amounts of magnetic flux generated in the V-phase coil elements, however, a magnetic flux generated in each V-phase coil element is divided into a magnetic flux toward the claw poles of the V-phase core and a magnetic flux toward the claw poles of the U-phase core or the W-phase core. Accordingly, an amount of magnetic flux toward the claw poles of the V-phase core from each V-phase coil element may be half the generated amount of magnetic flux.

Accordingly, in order to equalize the amounts of magnetic flux to magnetize the claw poles of the U-phase core, the V-phase core, and the W-phase core, an amount of magnetic flux that is generated in each V-phase core element may need to be adjusted to an amount of magnetic flux that is generated in the U-phase coil or the W-phase coil. Accordingly, the U-phase coil, each V-phase coil element, and the W-phase coil may need to have the same number of windings.

However, if the U-phase coil, the W-phase coil, and each V-phase coil element have the same number of windings, the U-phase coil, the W-phase coil, and the V-phase coil element may have the same resistance value. Since the resistance value of the V-phase coil is a sum of the resistance values of the two V-phase coil elements, the resistance value of the V-phase coil may become greater than the resistance value of the U-phase coil or the W-phase coil. As such, if the resistance values of the U-phase coil the V-phase coil and the W-phase coil are different from each other, current flowing through the individual cores may be unbalanced so that the rotation of the motor becomes unstable, resulting in the generation of vibration or noise.

In another claw pole type motor disclosed in Patent Document 2, the number S of the U-phase claw poles, V-phase claw poles, and W-phase claw poles is 12, and the number P of the N poles and S poles of the rotor is 8. Accordingly, the relation of S:P is 3:2, and in the proportional relation, the N poles and S poles of the rotor correspond to the U-phase claw poles, V-phase claw poles, and W-phase claw poles of the stator.

The relation will be understood with reference to FIG. 13. Referring to FIG. 13, when an electrical angle is represented by a circumferential angle, the circumferential angle of each of the N pole and the S pole becomes 180 degrees, and a circumferential angle obtained by summing the circumferential angles of the U-phase claw pole, the V-phase claw pole, and the W-phase claw pole corresponds to the circumferential angle of 360 degrees obtained by summing the circumferential angles of the N pole and the S pole. Accordingly, the maximum circumferential angle of each claw pole becomes 120 degrees.

However, the motor disclosed in Patent Document 2 has a problem that it cannot reduce cogging torque and the distortion of magnetic flux interlinkage. In order to resolve the problem, the circumferential angle of each claw pole needs to be within a range of 130 degrees to 160 degrees, however, in the motor disclosed in Patent Document 2, since the maximum circumferential angle of each claw pole is 120 degrees, the motor cannot reduce the distortion of magnetic flux interlinkage.

In addition, the U-phase core, the V-phase core, and the W-phase core are molded by pressing a magnetic material in a powder state in the axial line direction of the rotary shaft, errors are generated in accuracy of dimension in the axial line direction of the rotary shaft, so that air gaps may be formed between the U-phase core main body and the V-phase core main body and between the V-phase core main body and the W-phase core main body.

In this case, since the permeability of air is greatly different from that of the magnetic material configuring the cores, air acts as magnetic resistance, and the magnetic resistance generates deviation in the amount of magnetic flux passing through each core. Accordingly, the deviation in the amount of magnetic flux may influence the performance of the motor.

Also, Patent Document 3 discloses a motor manufactured by dividing a stator into a plurality of parts, fabricating each part through press processing, and then assembling the parts.

If a motor is manufactured by dividing a stator into a plurality of parts, the mass density of each part increases, which leads to an increase in mass density of the entire stator. Also, it is difficult to align the center axes of the plurality of parts divided in the diameter direction upon assembly. If the center axes of the plurality of parts are dislocated, the roundness of the claw poles deteriorates so that the rotation of the motor may be distorted, resulting in vibration or noise of the motor.

The above descriptions, Patent Document 1 is Japanese Patent Laid-open Publication No 2007-116847, Patent Document 2 is Japanese Patent Laid-open Publication No. 2005-180285, and Patent Document 3 is Japanese Patent Laid-open Publication No. 2008-079384.

DISCLOSURE

Technical Problem

An aspect of the present disclosure provide a claw pole type motor capable of reducing vibration or noise, and a home appliance including the claw pole type motor.

Technical Solution

In accordance with an embodiment of the present disclosure, there is provided a home appliance including a claw pole type motor, wherein the claw pole type motor includes: a first core including a first core main body disposed on a rotary shaft, a first elongation portion disposed in the center portion of the first core main body and extending in the axial line direction of the rotary shaft, and a plurality of first claw poles disposed in the edge portion of the first core main body and extending in the axial line direction of the rotary shaft; a second core including a second core main body disposed on the rotary shaft and a plurality of second claw poles disposed in the edge portion of the second core main body and extending in the axial line direction of the rotary shaft; and a third core including a third core main body disposed on the rotary shaft, a second elongation portion disposed in the center portion of the third core main body and extending in the axial line direction of the rotary shaft, and a plurality of third claw poles disposed in the edge portion of the third core main body and extending in the axial line direction of the rotary shaft, wherein the second core further includes a surrounding member disposed in the center portion of the second core main body and surrounding the first elongation portion and the second elongation portion.

Due to the structural feature, a magnetic flux passing between a U-phase core main body and a V-phase core main body may pass through a UV gap formed between the surrounding member of the second core main body and the first elongation port on of the first core main body, a magnetic flux passing between the V-phase core main body and a W-phase core main body may pass through a VW gap formed between the second core main body and the second elongation portion of the third core main body, and a magnetic flux passing between the U-phase core main body and the lift-phase core main body may pass through a UW gap formed between the fore-end surface of the first elongation portion and the fore-end surface of the second elongation portion.

Accordingly, since a magnetic flux passes through only one gap regardless of which gap the magnetic flux passes between, magnetic resistance and an amount of magnetic flux can be balanced, thereby suppressing vibration or noise of the motor. Also, since a magnetic flux passes through only one gap, a reduction of the amount of magnetic flux can be suppressed to the minimum level.

Also, according to the present disclosure, the surrounding member, the first elongation portion, and the second elongation portion are formed in the shape of a cylinder having a center hole, and the first elongation portion and the second elongation portion may be inserted into the center hole of the surrounding portion.

Also, according to the present disclosure, a length of the first elongation portion surrounded by the surrounding member may be equal to that of the second elongation portion surrounded by the surrounding member.

In this case, magnetic flux density passing through the UV gap formed between the first elongation portion and the surrounding member can become equal to magnetic flux density passing through the VW gap formed between the second elongation portion and the surrounding member, thereby su pressing vibration or noise of the motor.

Also, according to an embodiment of the present disclosure in which the effects of the present disclosure can be significantly obtained, the first core, the second core, and the third core of the claw pole type motor may be formed by pressing a magnetic material in a powder state in the axial line direction of the rotary shaft.

According to typical techniques, since gaps are formed in the axial line direction of the rotary shaft, and the gaps increase greatly due to fabrication errors, the characteristics of the motor deteriorate. However, according to the present disclosure, since some gaps (the UV gap and the VW gap) are formed in the diameter direction, fabrication errors can be reduced, thereby further improving the characteristics of the motor.

According to another embodiment of the present disclosure, there is provided a home appliance in which the first core is a U-phase core including a plurality of U-phase claw poles extending in the axial line direction of the rotary shaft from the first core main body, the second core is a V-phase core including a plurality of V-phase claw poles extending in the axial line direction of the rotary shaft from the second core main body, the third core is a W-phase core including a plurality of W-phase claw poles extending in the axial line direction of the rotary shaft from the third core main body, the U-phase core, the V-phase core, and the W-phase core further include a U-phase coil, a V-phase coil, and a W-phase coil for magnetizing the respective cores, the U-phase coil is disposed between the U-phase core main body and the V-phase core main body, the W-phase coil is disposed between the V-phase core main body and the W-phase core main body, and the V-phase coil includes a first V-phase coil element disposed between the U-phase core main body and the V-phase core main body and a second V-phase coil element disposed between the V-phase core main body and the W-phase core main body, wherein the first. V-phase coil element is connected in series to the second V-phase coil element.

Thereby, since the entire or a part of the diameter of the V-phase coil, that is, the diameters of the entire or parts of the first V-phase coil element and the second V-phase coil element are greater than those of the U-phase coil and the W-phase coil, the resistance values of the first V-phase coil element and the second V-phase coil element may be reduced so that the resistance value of the V-phase coil is nearly equal to those of the U-phase coil and the W-phase coil.

As such, if the resistance values of the U-phase coil, the V-phase coil, and the W-phase coil are the same so that the same voltage is applied to the U-phase coil, the V-phase coil, and the W-phase coil, the same current can flow through the phases, thereby reducing the generation of torque ripple, and preventing vibration or noise that is caused by unbalanced rotation of the motor.

Also, it is possible to reduce the resistance value of the V-phase coil, by changing only the diameters of the U-phase coil, the V-phase coil, and the W-phase coil without changing the windings of the coils. Accordingly, by installing the same number of V-phase coils as that of W-phase coils to pass a uniform magnetic flux, the rotation of the motor can be balanced.

According to another embodiment of the present disclosure, the first V-phase coil element may be disposed in the outside of the U-phase coil, and the second V-phase coil element may be disposed in the outside of the W-phase coil.

If two coils are disposed inside and outside each other, the length of the inner coil may be shorter than that of the outer coil. Accordingly, since the resistance value of a coil is proportional to the length of the coil, the resistance value of the inner coil may be smaller than that of the outer coil.

However, in the claw pole type motor according to the present disclosure, since the first V-phase coil element and the second V-phase coil element corresponding to outer coils have great diameters, the first V-phase coil element and the second V-phase coil element may have a resistance value that is similar to the resistance values of the U-phase coil and the W-phase coil. If the V-phase coil, the U-phase coil, and the W-phase coil have the similar resistance values, uniform current may flow through the individual phases so that the rotation of the motor can be balanced.

In regard of diameter, if the diameter of the U-phase coil or the W-phase coil is D1, and the diameter of the first V-phase coil element or the second V-phase coil element is D2, D1/D2 may be set to a value within a range of 1.0 to 1.4 in order to maximize the efficiency of the present disclosure.

According to another aspect of the present disclosure, the number of windings of the first V-phase coil element or the second V-phase coil element may be different from that of the U-phase coil or the W-phase coil.

Generally, the U-phase core, the V-phase core, and the W-phase core are manufactured by pressing iron cores in a powder state in the axial line direction, and the cores manufactured in this way may have different lengths in the axial line direction. Accordingly, the cores may have different lengths of magnetic paths, or magnetic resistance may be generated in fine air gaps of connection portions between the cores, so that flux unbalance may be generated in the U-phase core, the V-phase core, and the W-phase core due to fabrication errors.

In order to correct the flux unbalance a method of changing the number of windings of the first V-phase coil element, the second V-phase coil element, the U-phase coil, or the W-phase coil to adjust the resistance values of the coils may be used.

According to another aspect of the present disclosure, the first V-phase coil element may be disposed in the inside of the first U-phase coil, and the second V-phase coil element may be disposed in the inside of the W-phase coil, so that the entire or parts of the diameters of the U-phase coil and the W-phase coil may be set to be greater than the diameter of the V-phase coil.

Through the configuration, it is possible to reduce the resistance values of the first V-phase coil element and the second V-phase coil element corresponding to the inner coils, and to lower the resistance values of the U-phase coil and the W-phase coil corresponding to the outer coils by increasing the diameters of the U-phase coil and the W-phase coil. In this way, by making the U-phase coil, the V-phase coil, and the W-phase coil have the same resistance value so that uniform current can flow through the coils, the rotation of the motor can be balanced.

According to another embodiment of the present disclosure, a U-phase claw pole, a V-phase claw pole, and a W-phase claw pole may be arranged n this order such that a group of a U-phase claw pole, a V-phase claw pole, and a W-phase claw pole appears repeatedly in the circumferential direction, and a rotor ire which a plurality of N poles and S poles are alternately arranged in the circumferential direction in correspondence to the U-phase claw poles, the V-phase claw poles, and the W-phase claw poles may be further provided, wherein if a sum of the U-phase claw poles, the V-phase claw poles, and the W-phase claw poles is S and a sum of the N and S poles of the rotor is P, the ratio of S to P may satisfy Equation (1) below.

$$S:P=3:2(n+1)$$

$(n+1)\neq 3m$, wherein $n$ and $m$ are integers. (1)

In this way, (n+1) units each configured with two poles may be arranged, wherein is each unit, N pole and a S pole are arranged in the circumferential direction of the rotor in correspondence to a U-phase claw pole, a V-phase claw poles, and a W-phase claw pole of the stator.

Since the circumferential angle of each unit is 360 degrees, a circumferential angle obtaining by summing the U-phase claw poles, the V-phase claw poles, and the W-phase claw poles may become 360×(n+1) degrees. Accordingly, since the circumferential angle of each of the U-phase claw poles, the V-phase claw poles, and the W-phase claw poles becomes 120 degrees or more, cogging torque or the distortion of magnetic flux interlinkage can be reduced, resulting in a reduction of vibration or noise of the motor.

In Equation (1) representing the ratio of S to P, n may be preferably 1.

In the above-described configuration, since S:P is 3:4, two units each configured with two poles magnetized to a N pole and a S pole in the circumferential direction in correspondence to a U-phase claw pole, a V-phase claw pole, and a W-phase claw pole may be arranged. Accordingly, a circumferential angle obtained by summing the circumferential angles of the U-phase claw pole, the V-phase claw pole, and the W-phase claw pole may become 720 degrees (360 degrees×2), and the circumferential angle of each claw pole may become 240 degrees maximally. Accordingly, since the circumferential angle of each claw pole can become 120 degrees or more, cogging torque or the distortion of magnetic flux interlinkage can be reduced, resulting in a reduction of vibration or noise of the motor.

Also, by adjusting the circumferential width of each claw pole to a value in a range of 130 degrees to 160 degrees as an electrical angle, that is, by adjusting the circumferential angle of each claw pole to a value in a range of 130 degrees to 160 degrees as an electrical angle, more preferably, to 150 degrees, cogging torque or magnetic flux interlinkage can be further reduced, thereby more effectively reducing vibration or noise of the motor, as shown in FIG. 18.

A claw pole type motor according to an embodiment of the present disclosure may include: a first core including a first core main body disposed on a rotary shaft, a first elongation portion disposed in the center portion of the first core main body and extending in the axial line direction of the rotary shaft, and a plurality of first claw poles disposed in the edge portion of the first core main body and extending in the axial line direction of the rotary shaft; a second core including a second core main body disposed on the rotary shaft, and a plurality of second claw poles disposed in the edge portion of the second core main body and extending in the axial line direction of the rotary shaft; and a third core including a third core main body disposed on the rotary shaft a second elongation portion disposed in the center portion of the third core main body and extending in the axial line direction of the rotary shaft, and a plurality of third claw poles disposed in the edge portion of the third core main body and extending in the axial line direction of the rotary shaft, wherein the second core further includes a surrounding member disposed in the center portion of the second core main body and surrounding the first elongation portion and the second elongation portion.

A method of manufacturing a claw pole type motor according to an embodiment of the present disclosure is a method of manufacturing a pole type motor including a plurality of cores each including a core main body and a plurality of claw poles coupled with the core main body in such a way to extend in the axial line direction of a rotary shaft, wherein the plurality of claw poles are arranged in a predetermined order along the circumferential direction, and the method includes a molding process to dispose a die between the claw poles.

In the method of manufacturing the claw pole type motor configured as described above since the plurality of cores are fixed in a state in which the core main bodies are pressed in the axial line direction of the rotary shaft, the neighboring cores can be pressed to prevent air gaps from being formed in the axial line direction of the rotary shaft, thereby reducing vibration or noise of the motor.

Also, since the claw poles can be arranged at equidistant intervals in the circumferential direction by molding the plurality of cores into one body through a die, the motor can rotate smoothly, thereby reducing vibration or noise.

According to another aspect the method of manufacturing the claw pole type motor according to the present disclosure, the plurality of cores may include: a U-phase core including a U-phase core main body disposed on the axial line of the rotary shaft, a plurality of U-phase claw poles coupled with the U-phase core main body, and a first elongation portion coupled with the center lower portion of the U-phase core main body in the axial line direction of the rotary shaft; a V-phase core including a V-phase core main body disposed on the axial line of the rotary shaft below the U-phase core main body, and a plurality of V-phase claw poles coupled with the V-phase core main body: and a W-phase core including a W-phase core main body disposed on the axial line of the rotary shaft below the V-phase core main body, a plurality of W-phase claw poles coupled with the W-phase core main body, and a second elongation portion coupled with the center upper portion of the W-phase core main body the axial line direction of the rotary shaft, wherein the V-phase core main body includes a surrounding member surrounding the first elongation portion and the second elongation portion, and the molding process includes fixing the first elongation portion, the second elongation portion, and the surrounding member with a resin, and covering the entire or parts of the inner surfaces of the first elongation portion and the second elongation portion with a resin layer.

According to the above-described configuration, the U-phase core rain body and the W-phase core main body may be arranged in the axial line direction of the rotary shaft, and the U-phase core main body and the V-phase core main body, and the V-phase core main body and the W-phase core main body may be arranged in the circumferential direction If each core is configured by pressing a magnetic material in a powder state in the axial line direction of the rotary shaft, air gaps may be hardly formed between the U-phase core main body and the V-phase core main body and between the V-phase core main body and the W-phase core main body, since accuracy in dimension of the circumferential direction that is vertical to the axial line direction of the rotary shaft is significantly excellent rather than accuracy in dimension of the axial line direction of the rotary shaft. Also, since the U-phase core main body and the W-phase core main body are pressed and fixed to each other, no air gap may be formed between the U-phase core main body and the W-phase core main body, thereby reducing vibration or noise of the motor.

Also, in the above-described configuration, since only the U-phase core main body and the W-phase core main body are arranged in the axial line direction of the rotary shaft, it is possible to stably press the core main bodies, thereby improving productivity.

According to another aspect of the method of manufacturing the claw pole type motor according to the present disclosure, the molding process may include operation of forming a resin layer to cover at least one inner surface of the first elongation portion and the second elongation portion, while fixing the first elongation portion, the second elongation portion, and the surrounding member with the resin in the state of pressing the fore-end surface of the first elongation portion and the fore-end surface of the second elongation portion.

Through the above-described configuration, since the resin layer can be interposed between the U-phase core main body, the V-phase core main body, the W-phase core main body, and a member coupled with the core bodies, for example, a member such as a bearing that is inserted into the nearly center portions of the U-phase core main body, the V-phase core main body, and the W-phase core main body, it is possible to prevent transfer of heat generated from the U-phase core main body, the V-phase core main body, and the W-phase core main body.

Also, a claw pole type motor manufactured using the above-described method is also another embodiment of the present disclosure.

The method of manufacturing the claw pole type motor according to the present disclosure may be a method of manufacturing a claw pole type motor including a plurality of cores each including a core main body, and a plurality of claw main bodies extending in the axial line direction of the rotary shaft from the core main body, and may be characterized in that each core main body is configured by combining a plurality of parts formed by dividing a ring-shaped member in the shape of a concentric circle, and the plurality of claw poles are integrally arranged in the circumferential edge portion of the outermost part.

Since the plurality of parts constituting the core main body are divided in the shape of a concentric circle, the center axes of the parts can be easily aligned upon assembly. Due to the structural feature, it is possible to prevent rotation of the motor from being distorted due to deterioration in roundness of the claw poles, thereby reducing vibration or noise of the motor.

Since the claw poles are integrally arranged in the circumferential edge portion of the outermost part, the claw poles can be located when the parts are located, so that the claw poles can be easily located compared to the case of installing the parts and the claw poles separately.

Also, an embodiment in which the effects of the present disclosure can be significantly obtained is to form the claw poles by pressing a soft magnetic material in a powder state in the axial line direction of the rotary shaft.

That is, since the mass density of each part can increase by increasing pressure upon press processing when manufacturing the part, a high-performance stator having high mass density and low magnetic resistance can be manufactured.

An embodiment of the method of manufacturing the claw pole type motor according to the present disclosure is to form the slaw poles with a material that is different from that forming the parts.

In this case, since high-priced insulation particles for insulating iron are used in only the claw poles, and a material that is different from the insulation particles for insulating iron can be used in the parts, manufacturing cost can be reduced.

Another embodiment of the method of manufacturing the claw pole type motor according to the present disclosure is to form the claw poles with a material having higher volume resistivity than that forming the parts.

If the motor operates, eddy current is generated on the surfaces of the claw poles, and the cores emit heat by the eddy current to generate eddy loss resulting in energy loss, which may lower the efficiency of the motor. However, in the present disclosure, since the claw poles are formed with a material having higher volume resistivity than that forming the parts to increase the electrical resistance of the claw poles, eddy current that is generated on the surfaces of the claw poles can be reduced.

In another embodiment of the method of manufacturing the claw pole type motor according to the present disclosure, a coil layer for magnetizing the claw poles may be further provided, the plurality of parts may be composed of first parts and second parts disposed inside the first parts, and the external diameter of the second parts may be greater than the external diameter of the coil.

In this case, for example, a claw pole type motor can be manufactured by fabricating a combination of the first parts and a combination of the second parts.

The manufacturing method can easily manufacture a claw pole type motor by improving assembling efficiency compared to a manufacturing method of fabricating cores by combining first parts and second parts to fabricate the cores, disposing coils in gaps between the cores, and fixing them.

According to another aspect of the method of manufacturing the claw pole type motor of the present disclosure, the first parts may support the claw poles on the outer circumferential surface, and the second parts may be configured with a plurality of elements divided in the diameter direction.

In this case, electrical resistance may be generated between three elements of the second parts divided in the diameter direction, and eddy current flowing in the circumferential direction may be reduced by the electrical resistance. Also, since the first parts supporting the claw poles are not divided in the diameter direction, it is possible to prevent the roundness of the claw poles from deteriorating.

According to another aspect of the method of manufacturing the claw pole type motor of the present disclosure, the first parts and the second parts may be pressed in and fixed.

In this case, no gap may be formed between the first parts and the second parts, thereby improving the performance of the motor.

According to an example of the method of manufacturing the clay pole type motor according to the present disclosure, the plurality of cores may include a U-phase core including a U-phase core main body, a V-phase core including a V-phase core main body, and a W-phase core including a W-phase core main body, the coils may include a U-phase coil, a V-phase coil, and a W-phase coil, the U-phase coil may be disposed between the U-phase core main body and the V-phase core main body, the W-phase coil may be disposed between the V-phase core main body and the W-phase core main body, the V-phase coil may be configured with a first V-phase coil element and a second V-phase coil element connected in series to each other, the first V-phase coil element may be disposed between the U-phase core main body and the V-phase core main body, and the second V-phase coil element may be disposed between the V-phase core main body and the W-phase core main body.

In this case, since the claw pole type motor can be manufactured by disposing the U-phase coil and the first V-phase coil element in space formed between the U-phase core main body and the V-phase core main body and disposing the second V-phase coil element and the W-phase coil in space formed between the V-phase core main body and the W-phase core main body, the claw pole type motor can be manufactured with substantially three core main bodies and two coils, thereby improving manufacturing efficiency.

Also, a claw pole type motor manufactured using the above-described method may be also another embodiment of the present disclosure.

Advantageous Effects

According to the present disclosure, there are provided a claw poly type motor capable of reducing vibration or noise, and a home appliance including the same.

BRIEF DESCRIPTION OF THE DRAWINGS

FIG. 1 is a perspective view of a claw pole type motor according to an embodiment of the present disclosure.

FIG. 2 is a perspective view showing a rotor and a stator of a claw pole type motor according to an embodiment of the present disclosure.

FIG. 3 is a perspective view of a rotor according to an embodiment of the present disclosure.

FIG. 4 is a perspective view of a stator according to an embodiment of the present disclosure.

FIG. 5 is an exploded perspective view of a stator according to an embodiment of the present disclosure.

FIG. 6 is a cross-sectional view of the stator according to an embodiment of the present disclosure, cut along a line A-A of FIG. 4.

FIG. 7 is a top view showing circumferential angles of a claw pole type motor according to an embodiment of the present disclosure.

FIG. 8 is a cross-sectional view for describing a method of manufacturing claw pole type motor according to an embodiment of the present disclosure.

FIG. 9 is a perspective view for describing a method of manufacturing a U-phase core according to an embodiment of the present disclosure.

FIG. 10 is a perspective view for describing a method of manufacturing a V-phase core according to an embodiment of the present disclosure.

FIG. 11 is a perspective view for describing a method of manufacturing a W-phase core according to an embodiment of the present disclosure.

FIG. 12 is a cross-sectional view of the stator according to an embodiment of the present disclosure cut along a line A-A of FIG. 4.

FIG. 13 is a top view showing circumferential angles of a typical claw pole type motor.

FIG. 14 shows the inside of a refrigerator including a claw pole type motor according to an embodiment of the present disclosure.

FIG. 15 shows the outer appearance of an air conditioner including a claw pole type motor according to an embodiment of the present disclosure.

FIG. 16 shows the inside of an air conditioner including a claw pole type motor according to an embodiment of the present disclosure.

FIG. 17($a$) is a graph showing the waveform of alternating current in a typical claw pole type motor, and FIG. 17($b$) is a graph showing the waveform of alternating current in a claw pole type motor according to an embodiment of the present disclosure.

FIG. 18 is a graph showing the relationship of torque with respect to rotor position in a claw pole type motor according to an embodiment of the present disclosure.

FIG. 19 is a graph showing the relationship of torque ripple with respect to rotor position in a typical claw pole type motor.

FIG. 20 is a graph showing the relationship of torque ripple with respect to rotor position in a claw pole type motor according to an embodiment of the present disclosure.

FIG. 21 is a graph showing the relationship of cogging torque with respect to circumferential angles of claw poles in a claw pole type motor according to an embodiment of the present disclosure.

BEST MODE

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

The terms used in the present specification are used to describe the embodiments of the present disclosure. Accordingly, it should be apparent to those skilled in the art that the following description of exemplary embodiments of the present invention is provided for illustration purpose only and not for the purpose of limiting the invention as defined by the appended claims and their equivalents. It is to be understood that the singular forms "a," "an," and "the" include plural referents unless the context clearly dictates otherwise.

It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Hereinafter, a claw pole type motor according to the present disclosure will be described in detail with reference to the drawings.

A claw pole type motor 1 according to an embodiment of the present disclosure is widely used in various fields, such as a refrigerator, an air conditioner, and a vehicle, due to its high efficiency.

In the detailed description of the present disclosure, the configuration of the claw pole type motor 1 and a method of manufacturing the claw pole type motor 1 will be described, and a refrigerator 100 including the claw pole type motor 1, and an outdoor unit 200 of an air conditioner including the claw pole type motor 1 will be described. Although the claw pole type motor 1 is applied to the refrigerator 100 and the outdoor unit 200 of the air conditioner in this specification, the claw pole type motor 1 can be included in various other home appliances.

FIG. 1 is a perspective view of a claw pole type motor according to an embodiment of the present disclosure, and FIG. 2 is a perspective view showing a rotor and a stator of a claw pole type motor according to an embodiment of the present disclosure.

FIG. 3 is a perspective view of a rotor according to an embodiment of the present disclosure, FIG. 4 is a perspective view of a stator according to an embodiment of the present disclosure, and FIG. 5 is an exploded perspective view of a stator according to an embodiment of the present disclosure.

As shown in FIGS. 1 and 2, the claw pole type motor 1 may include a rotor 2 in which a plurality of permanent magnets 18 (referred to as poles in claims) are arranged in the inner circumferential direction and a stator 3 in which a plurality of claw poles 5 (5a, 5b, 5c) extending in the direction of an axial line are arranged in the outer circumferential direction, wherein the inner circumferential surface of the rotor 2 faces the outer circumferential surface of the stator 3. Also, the rotor 2 may rotate by an attractive force and a repulsive force that are generated between the permanent magnets 18 of the rotor 2 and the claw poles 5 of the stator 3, and the rotor 2 may rotate in the circumferential direction with respect to a virtual axial line positioned at the center.

The rotor 2 may be formed in the shape of a cylinder whose one side opens and whose other side closes, and in the center of the closed side of the rotor 2, a rotary shaft 4 for rotating the rotor 2 may be inserted and fixed, as shown in FIGS. 1, 2, and 3.

Also, on the inner circumferential surface of the rotor 2 the plurality of permanent magnets 18 formed in the shape of long pieces extending in the axial line direction of a rotary shaft 4 may be a ranged at equidistant intervals in the circumferential direction. The plurality of permanent magnets 18 may be arranged such that an N pole and a S pole appear alternately in the circumferential direction. In the current embodiment, the number of the permanent magnets 18, which is the total number of N polar permanent magnets 18a and S polar permanent magnets 18b, may be 24. In the following description, for convenience of description, an N polar permanent magnet 18a and a S polar permanent magnet 18b neighboring the N polar permanent magnet 18a in the circumferential direction will be referred to as a unit 23.

The stator 3 may include, as shown in FIGS. 4 and 5, a U-phase core 8, a V-phase core 9, and a W-phase core 10 which form a magnet circuit for magnetizing the claw poles 5 (5a, 5b, 5c), and a U-phase coil 14, a V-phase coil 15, and a W-phase coil 16 for magnetizing the respective cores.

The U-phase core 8 may include a U-phase core mar body 1 disposed on the axial line of the rotary shaft 4, and a plurality of U-phase claw poles 5a disposed in the edge portion of the U-phase core main body 19 and extending in the axial line direction of the rotary shaft 4, as shown in FIG. 5. The U-phase core main body 19 may include a ring-shaped member 11a to support the U-phase claw poles 5a arranged at equidistant intervals of 60 degrees, and a center cylindrical member 12a formed on one surface of the ring-shaped member 11a and disposed on the same axis as the ring-shaped member 11a in such a way to be integrated into the ring-shaped member 11a.

The center cylindrical member 12a may correspond to a first elongation portion described in the claims, and protrude in the same direction in which the U-phase claw poles 5a extend.

The V-phase core 9 may include a V-phase core main body 20 disposed below the U-phase core main body 19 on the axial line of the rotary shaft 4, and a plurality of V-phase claw poles 5b coupled with the outer circumference of the V-phase core main body 20 and extending in the axial line direction of the rotary shaft 4, as shown in FIG. 5. The V-phase core main body 20 may include a center cylindrical member 12b having a center hole, and a plurality of arms 17 having the same height in the axial line direction with respect to the center cylindrical member 12b, and extending in a radial shape from the center in axial line direction of the center cylindrical member 12b.

The center cylindrical member 12b may correspond to a surrounding member described in the claims, and the internal diameter of the center cylindrical member 12b may be equal to the external diameter of the center cylindrical member 12a of the U-phase core 8.

The ends of the arms 17 may be connected to the centers in longitudinal direction of the V-phase claw poles 5b, and the V-phase claw poles 5b may extend in the axial line direction to be line-symmetrical to the arms 17.

In the current embodiment, since six arms 17 extend at equidistant intervals of 60 degrees, six V-phase claw poles 5b connected to the ends of the six arms 17 may also be arranged at equidistant intervals of 60 degrees.

The W-phase core 10 may include a W-phase core main body 21 disposed below the V-phase core main body 20, and a plurality of W-phase claw poles 5c coupled with the W-phase core main body 20 and extending in the axial line direction, as shown in FIG. 5.

The W-phase core main body 21 may include a ring-shaped member 11c to support the W-phase claw poles 5c arranged at equidistant intervals of 60 degrees, and a center cylindrical member 12c formed on one surface of the ring-shaped member 11c and disposed on the same axis as the ring-shaped member 11c in such a way to be integrated into the ring-shaped member 11c.

The center cylindrical member 12c may correspond to a second elongation portion described in the claims, and protrude toward the U-phase core main body 19. The W-phase claw poles 5c may extend in the same direction in which the center cylindrical member 12c protrudes. The direction may be opposite to the extending direction of the U-phase claw poles 5a, and the first elongation portion (the center cylindrical member 12a) of the U-phase core 8 may extend toward the W-phase core main body 21. Also, the internal diameter and external diameter of the center cylindrical member 12c may be respectively equal to the internal diameter and external diameter of the center cylindrical member 12a of the U-phase core 8.

In the U-phase core 8, the V-phase core 9, and the W-phase core 10, the fore-end surface of the center cylindrical member 12a may face the fore-end surface of the center cylindrical member 12c such that the center line of the U-phase core main body 19 and the center line of the W-phase core main body 21 are on the axial line of the rotary shaft 4, wherein the fore-end surface of the center cylindrical member 12a may be located close to or contact the fore-end surface of the center cylindrical member 12c.

The fore-end surface of the center cylindrical member 12a may contact the fore-end surface of the center cylindrical member 12c without making any gap in the center hole of the center cylindrical member 12b, such that the center line of the V-phase core main body 20 is on the axial line of the rotary shaft 4. In this state, the U-phase core 8, the V-phase core 9, and the W-phase core 10 may be fixed with a resin, etc.

In this state, a UW gap G1 may be formed between the fore end surface of the center cylindrical member 12a and the fore-end surface of the center cylindrical member 12c, as shown in FIG. 5. Also, a UV gap G2 may be formed between the fore-end surface of the center cylindrical member 12b and the external circumferential surface of the center cylindrical member 12a, and a VW gap G3 may be formed between the fore-end surface of the center cylindrical member 12b and the external circumferential surface of the center cylindrical member 12c.

The fore-end portion of the center cylindrical member 12a and the center cylindrical member 12c may be surrounded by the center cylindrical member 12b, and a depth of the center cylindrical member 12a surrounded by the center cylindrical member 12b may be equal to that of the center cylindrical member 12b surrounded by the center cylindrical member 12b. Through the configuration, magnetic flux density passing through the UV gap G2 can become equal to magnetic flux density passing through the VW gap G3, thereby suppressing vibration or noise of the motor due to a more uniform amount of magnetic flux.

The widths of the UV gap G2, the UW gap G1, and the VW gap G3 may be preferably zero, however, if the widths of the UV gap G2, the UW gap G1, and the VW gap G3 are not zero, the margins of error of the widths of the UV gap G2 and the VW gap G3 may be significantly smaller than the margin of error of the width of the UW gap G1.

The reason is because accuracy of dimension in the axial line direction of the rotary shaft 4 is lower than that in the radial direction, and fabrication errors of the UW gap G1 in the axial line direction of the rotary shaft 4 are greater than those of the UV gap G2 and the VW gap G3 in the radial direction, since the U-phase core 8, the V-phase core 9, and the W-phase core 10 are fabricated by pressing a magnetic material in a powder state in the axial line direction of the rotary shaft 4.

The U-phase claw poles 5a, the V-phase core claw poles 5b, and the W-phase, claw poles 5c combined in this way may be arranged at intervals of 20 degrees in the circumferential direction in the order of the U-phase claw pole 5a, the V-phase claw pole 5b, and the W-phase claw pole 5c. In the current embodiment, the total number of the claw poles 5 which is a sum of the U-phase claw poles 5a the V-phase claw poles 5b and the W-phase claw poles 5c may be 18.

In the rotor 2 and the stator 3 configured as described above, if the number of the permanent magnets 18 of the rotor 2 is P, and the total number of the U-phase claw poles 5a, the V-phase claw poles 5b, and the W-phase claw poles 5c of the stator 3 is S, the following Equation (1) can be satisfied.

$$S:P=3:2(n+1)$$

$(n+1) \neq 3m$, where $n$ and $m$ are integers.

More specifically, since S is 18 and P is 24, S:P=3:4.

Accordingly, in the claw pole type motor 1 according to the current embodiment, two units 23 each configured with two permanent magnets 18a and 18b of the rotor 2 may be arranged in correspondence to the U-phase claw pole 5a, the V-phase claw pole 5b, and the W-phase claw pole 5c of the stator 3.

If this relationship is represented as circumferential angles in the circumferential direction, the circumferential angles of the permanent magnet 18a magnetized to the N pole and the permanent magnet 18b magnetized to the S pole may be 180 degrees, and accordingly, the circumferential angle of each unit 23 may be 360 degrees.

Also, as shown in FIG. 7, the total circumferential angle of the U-phase claw pole 5a, the V-phase claw pole 5b, and the W-phase claw pole 5c corresponding to the two units 23 may be 720 degrees (=360 degrees×2). Accordingly, the circumferential angle of each claw pole 5 may be maximally 240 degrees by dividing 720 degrees by 3.

In the current embodiment, the circumferential angle of the U-phase claw pole 5a, the V-phase claw pole 5b, and the W-phase claw pole 5c may be preferably in a range of 130 degrees to 160 degrees, and may be, more preferably, 150 degrees in order to improve the efficiency of the present disclosure.

The U-phase coil 14 may be formed by winding a wire having a predetermined diameter around a first bobbin 7a provided as an insulator. The first bobbin 7a may be disposed in space S1 formed between the U-phase core main body 19 and the V-phase core main body 20 such that the center line of the first bobbin 7a is on the axial line of the rotary shaft 4. The space S1 may be sealed by a resin.

The W-phase coil 16 may be formed by winding a wire having a predetermined diameter around a second bobbin 7b provided as an insulator. The second bobbin 7b may be disposed in space S2 formed between the V-phase core main body 20 and the W-phase core main body 21, such that the center line of the second bobbin 7b is on the axial line of the rotary shaft 4. The space S2 may be sealed by a resin.

The V-phase coil 15 may be configured with a first V-phase coil element 15a and a second V-phase coil element 15b connected in series to each other, as shown in FIG. 6.

The first V-phase coil element 15a may be formed by winding a wire having a predetermined diameter around the first bobbin 7a provided as an insulator. The first bobbin 7a may be disposed in the space S1 such that the center line of the first bobbin 7a is on the axial line of the rotary shaft 4, as described above.

The second V-phase coil element 15b may be formed by winding a wire having a predetermined diameter around the second bobbin 7b provided as an insulator. The second bobbin 7b may be disposed in the space S2 such that the center line of the second bobbin 7b is on the axial line of the rotary shaft 4, as described above.

In the space S1, the first V-phase coil element 15a may be positioned at the outer area, and the U-phase coil 14 may be positioned at the inner area. Also, in the space S2, the second V-phase coil element 15b may be positioned at the outer area, and the W-phase coil 16 may be positioned at the inner area. However, in the current embodiment, it is assumed that the U-phase coil 14, the first V-phase coil element 15a, the second V-phase coil element 15b, and the W-phase coil 16 have the same number of windings.

Also, if the winding direction of the U-phase coil 14 is positive, the winding direction of the first V-phase coil element 15a may be positive, the winding direction of the second V-phase coil element 15b may be negative, and the winding direction of the W-phase coil 16 may be negative. The coils may be connected to a final terminal of a wire (not shown).

Also, the diameters of the first V-phase coil element 15a and the second V-phase coil element 15b may be greater than those of the U-phase coil 14 and the W-phase coil 16, as shown in FIG. 6.

Herein, if the resistance of each coil is R Ω, the diameter of the coil is D mm, the length of the coil is L mm, and the resistivity of metal constructing the coil is a, the following Equation (2) can be satisfied.

$$R = aL/D^2 \qquad (2)$$

That is, it can be seen from Equation (2) that as the diameter of the coil increases, the resistance of the coil decreases, and as the number of windings of the coil increases or the circumference of the coil increases, the resistance of the coil increases.

So far, the components of the claw pole type motor 1 have been described. Hereinafter, a method of manufacturing the claw pole type motor 1 will be described.

FIG. 8 is a cross-sectional view describing a method of manufacturing claw pole type motor according to an embodiment of the present disclosure, and FIG. 9 is a perspective view for describing a method of manufacturing a U-phase core according to an embodiment of the present disclosure.

FIG. 10 is a perspective view for describing a method of manufacturing a V-phase core according to an embodiment of the present disclosure, and FIG. 11 is a perspective view for describing a method of manufacturing a W-phase core according to an embodiment of the present disclosure.

The U-phase core 8, the V-phase core 9, and the W-phase core 10 may be formed by performing a core manufacturing process of pressing a soft magnetic material in a powder state in the axial line direction of the rotary shaft. The material that is to be pressed may be a steel sheet.

Then, the center cylinder member 12a and the center cylinder member 12c may be disposed such that the fore-end surface of the center cylinder member 12a faces the fore-end surface of the center cylinder member 12c, and the center lines of the U-phase core main body 19 and the W-phase core main body 21 are on the axial line of the rotary shaft 4. Also, the fore-end surface of the center cylindrical member 12a may contact the fore-end surface of the center cylindrical member 12c without making any gap therebetween, in the center hole of the center cylindrical member 12b, and the V-phase core 9 may be disposed between the U-phase core 8 and the W-phase core 10.

In this state, the U-phase coil 14 and the first V-phase coil element 15a may be disposed in the space S1 formed between the U-phase core main body 19 and the V-phase core main body 20, and the second V-phase coil element 15b and the W-phase coil 16 may be disposed in the space S2 formed between the V-phase core main body 20 and the W-phase core main body 21. The U-phase core 8 the V-phase core 9 the W-phase core 10, the U-phase coil 14, the V-phase coil 15, and the W-phase coil 16 arranged in this way will be referred to as a stator forming member 30.

Finally, the stator forming member 30 may be inserted in the axial line direction of the rotary shaft 4 by an upper die 31 and a lower die 32, as shown in FIG. 8.

In the upper die 31 and the lower die 32, a concave portion may be formed to accommodate the stator forming member 30 therein.

The open end of the upper die 31 in which the concave portion is formed may contact the open end of the lower die 31 in which the concave portion is formed, and a plurality of injection holes 37 for injecting a resin, and a plurality of insertion pin holes 40 into which a plurality of insertion pins 38 are inserted may be formed in the upper die 31, as shown in FIG. 8.

In the lower die 32, a plurality of position deciding convex portions 39 for deciding the position of the stator forming member 30 may be formed, as shown in FIG. 8, and the position deciding convex portions 39 may be arranged at equidistant intervals of 20 degrees as a mechanical angle in the circumferential direction.

Also, the stator forming member 30 may be interlocked with the concave portion of the lower die 32, the open end of the lower die 32 in which the concave portion is formed may be aligned with the open end of the upper die 31 in which the concave portion is formed, and then the stator forming member 30 30 may be accommodated in the inside of the upper die 31 and the lower die 32.

At this time, the position deciding convex portions 39 of the lower die 32 may contact the U-phase claw poles 5a, the V-phase claw poles 5b, and the W-phase claw poles 5c of the stator forming member 30.

Also, the insertion pins 38 may be inserted into the insertion pin holes 40 formed in the upper die 31. The insertion pins 38 may press and insert the stator forming member 30 into the lower die 32, and simultaneously, a resin may be injected into the injection holes 37 formed in the upper die 31 to fix the stator forming member 30, thereby performing a molding process.

At this time, the insertion pins 38 may apply pressure onto the center cylindrical member 12a of the U-phase core 8. Through this process, the fore-end surface of the center cylindrical member of the U-phase core 8 having strongest strength against weight applied in the axial line direction of the rotary shaft may be interlocked with the fore-end surface of the center cylindrical member 12c of the W-phase core 10 to thus contact the fore-end surface of the center cylindrical member 12c without making any gap.

Accordingly, the center cylindrical member 12a and the center cylindrical member 12c may be fixed by the resin in the state in which the fore-end surface of the center cylindrical member 12a is pressed on the fore-end surface of the center cylinder members 12c.

The positions of the U-phase claw poles 5a, the V-phase claw poles 5b, and the W-phase claw poles 5c may be decided and fixed by the position deciding convex portions 39 formed in the lower die 32.

In this case, a resin layer may be formed on at least one area of the inner surface of the center cylindrical member 12a and on at least one area of the inner surface of the center cylindrical member 12c. Thereby, a member such as a bearing that is inserted into the center cylindrical member 12a and the center cylindrical member 12c may contact the center cylindrical member 12a and the center cylindrical member 12c through the resin layer, so as to prevent heat generated by the stator 3 from being transferred to the member such as the bearing.

Also, the claw pole type motor may be manufactured by the following method.

The U-phase core main body 19 may be configured with a first U-phase part 41 and a second U-phase part 42, as shown in FIG. 9. The first U-phase part 41 and the second U-phase part 42 may be formed by dividing a nearly circular member into two pieces of a concentric circle shape.

The first U-phase part 41 may be disposed outside the second U-phase part 42, and a plurality of U-phase claw poles 5a may be arranged at equidistant intervals in the circumferential direction on the outer surface of the first U-phase part 41, as shown in FIG. 9.

The second U-phase part 42 may contact the inner surface of the first U-phase part 41 without making any gap with the first U-phase part 41, as shown in FIG. 9, and a cylindrical member may be disposed on the inner surface of the second U-phase part 42.

Also, the external diameter of the second U-phase core 42 may be greater than those of the U-phase coil 14, the V-phase coil 15 (the first V-phase coil element 15a and the second V-phase coil element 15b), and the W-phase coil 16. Also, the second U-phase part 42 may be configured by arranging three elements divided in the diameter direction at intervals of 120 degrees in the circumferential direction.

The V-phase core main body 20 may be configured with a first V-phase part 43 and a second V-phase part 44 disposed inside the first V-phase part 43, as shown in FIG. 10. The first V-phase part 43 and the second V-phase part 44 may be formed by dividing a circular plate into two pieces of a concentric circle shape.

The first V-phase part 43 may include a main body disposed outside the second V-phase part 44 and having a ring shape, a plurality of arms 17 extending in a radial direction from the main body, and a plurality of V-phase claw poles 5b connected to the ends of the arms 17 and extending in the axial line direction of the rotary shaft, as shown in FIG. 10.

The second V-phase part 44 may include a main body formed in the shape of a ring and contacting the inner surface of the first V-phase part 43 without making any gap with the first V-phase part 43, and a cylindrical member connected to the inner surface of the main body and coupled with the center portion of the rotary shaft 4, as shown in FIG. 10.

Also, the external diameter of the second V-phase part 44 may be greater than those of the U-phase coil 14, the V-phase coil 15 (the first V-phase coil element 15a and the second V-phase coil element 15b), and the W-phase coil 16. Also, the second V-phase part 44 may be configured by arranging three elements divided in the diameter direction at intervals of 120 degrees in the circumferential direction.

The W-phase core main body 21 may be configured with a first W-phase part 45 and a second W-phase part 46, as shown in FIG. 11. The first W-phase part 45 and the second W-phase part 46 may be formed by dividing a nearly circular member into two pieces of a concentric circle shape.

The first W-phase part 45 may be disposed outside the second W-phase part 46, and include a plurality of W-phase claw poles 5c arranged at equidistant intervals in the circumferential direction on the outer surface of the first W-phase part 45, as shown in FIG. 11.

The second W-phase part 46 may contact the inner surface of the first W-phase part 45 without making any gap with the first W-phase part 45, and a cylindrical member may be disposed on the inner surface of the second W-phase part 46, as shown in FIG. 11. Also, the external diameter of the second W-phase part 46 may be greater than those of the U-phase coil 14, the V-phase coil 15 (the first V-phase coil element 15a and the second V-phase coil element 15b), and the W-phase coil 16. Also, the second W-phase part 46 may be configured by arranging three elements divided in the diameter direction at intervals of 120 degrees in the circumferential direction.

The first U-phase part 41, the second U-phase part 42, the first V-phase part 43, the second V-phase part 44, the first W-phase part 45, and the second W-phase part 46 may be formed by pressing a soft magnetic material in a powder state in the axial line direction of the rotary shaft.

Also, the U-phase claw poles 5a, the V-phase claw poles 5b, and the W-phase claw poles 5c respectively integrated into the first U-phase part 41, the first V-phase part 43, and the first W-phase part 45 may be fabricated when the first U-phase part 41, the first V-phase part 43, and the first W-phase part 45 are pressed.

A material used for fabricating the first U-phase part 41, the second U-phase part 42, the first V-phase part 43, the second V-phase part 44, the first W-phase part 45, and the second W-phase part 46 may be different from a material used for fabricating the U-phase claw poles 5a, the V-phase claw poles 5b, and the W-phase claw poles 5c.

More specifically, the U-phase claw poles 5a, the V-phase claw poles 5b, and the W-phase claw poles 5c may be formed of a material having higher volume resistivity than a material forming the second U-phase part 42, the second V-phase part 44, and the second W-phase part 46.

A first part group may be fabricated by making the center axes of the first U-phase part 41, the first V-phase part 43, and the first W-phase part 45 identical to the axial line of the rotary shaft, coupling the parts 41, 43, and 45 in the axial line direction of the rotary shaft in this order, and then fixing the parts 41, 43, and 45 with a resin.

Since the first U-phase part 41, the first V-phase part 43, and the first W-phase part 45 include the U-phase claw poles 5a the V-phase claw poles 5b, and the W-phase claw poles 5c, respectively, the positions of the U-phase claw poles 5a, the V-phase claw poles 5b, and the W-phase claw poles 5c may also be decided when the first U-phase part 41, the first V-phase part 43, and the first W-phase part 45 are fixed.

Also, on the edge portions of the first part group, the U-phase claw poles 5a, the V-phase claw poles 5b, and the W-phase claw poles 5c may be arranged repeatedly at equidistant intervals in the circumferential direction, in the order of the U-phase claw pole 5a, the V-phase claw pole 5b, and the W-phase claw pole 5c. Also, in the center of the first part group, a nearly cylindrical hole may be formed.

Then, first inner unit may be fabricated by disposing the U-phase coil 14 and the first V-phase coil element 15*a* between the second U-phase part 42 and the second V-phase part 44, coupling the U-phase coil 14 with the first V-phase coil element 15*a* in the axial line direction of the rotary shaft such that the center axis of the U-phase coil 14 is on the center axis of the first V-phase coil element 15*a*, and then fixing the U-phase coil 14 and the first V-phase coil element 15*a*.

The external diameters of the second U-phase part 42 and the second V-phase part 44 may be greater than those of the U-phase coil 14, the V-phase coil 15 (the first V-phase coil element 15*a* and the second V-phase coil element 15*b*), and the W-phase coil 16, and the U-phase coil 14 and the first V-phase coil element 15*a* may be accommodated between the second U-phase part 42 and the second V-phase part 44 without escaping from the second U-phase part 42 and the second V-phase part 44.

Also, a second inner unit may be fabricated by disposing the second V-phase coil element 15*b* and the W-phase coil 16 above the second W-phase part in the axial line direction of the rotary shaft, making the center axes of the second V-phase coil element 15*b* and the W-phase coil 16 identical to the center axis of the second W-phase part 46, and then fixing the second V-phase coil element 15*b* and the W-phase coil 16. In this case, like rise the external diameter of the second W-phase part 46 may be greater than those of the U-phase coil 14, the V-phase coil 15 (the first V-phase coil element 15*a* and the second V-phase coil element 15*b*), and the W-phase coil 16, so that the second V-phase coil element 15*b* and the W-phase coil 16 may be accommodated in the second W-phase part 46 without escaping from the second W-phase part 46.

Finally, the second inner unit may be disposed in the nearly cylindrical hole formed in the center of the first part group, the first inner unit may be disposed above the second inner unit in the axial line direction of the rotary shaft, and the second inner unit and the first inner unit may be fixed with a resin.

So far, the claw pole type motor 1, and the method of manufacturing the claw pole type motor 1 have been described. Hereinafter, an operating sequence of the claw pole type motor 1 will be described.

First, if a voltage is applied to the W-phase coil 16, current may flow by a difference between the applied voltage and a voltage generated in the W-phase coil 16 and the resistance of the W-phase coil 16, and a magnetic flux may be generated by the current. The magnetic flux may be formed toward the W-phase claw poles 5*c* from the W-phase core main body 21 to magnetize the W-phase claw poles 5*c* to N poles, while magnetizing the V-phase claw poles 5*b* and the U-phase claw poles 5*a* to S poles.

Then, if a voltage is applied to the U-phase coil 14, current may flow by a difference between the applied voltage and a voltage generated in the U-phase coil 14 and the resistance of the U-phase coil 14, and a magnetic flux may be generated by the current.

Since the direction of Windings of the W-phase coil 16 is opposite to that of the U-phase coil 14, the magnetic flux may be formed toward the U-phase claw poles 5*a* from the U-phase core main body 19 to magnetize the U-phase claw poles 5*a* to N poles, while magnetizing the V-phase claw poles 5*b* and the W-phase claw poles 5*c* to S pole Finally, if a voltage is applied to the V-phase coil 15, that is, the first V-phase coil element 15*a* and the second V-phase coil element 15*b*, current may flow through the first V-phase coil element 15*a* by a difference between the applied voltage and a voltage generated in the first V-phase coil element 15*a* and the resistance of the first V-phase coil element 15*a*. A current may flow through the second V-phase coil element 15*b* by a difference between the applied voltage and a voltage generated in the second V-phase coil element 15*b* and the resistance of the second V-phase coil element 15*b*.

A magnetic flux generated by the current flowing through the f at V-phase coil element 15*a* may be formed toward the V-phase core main body 20 or the W-phase core main body 21 from the U-phase core main body 19 to magnetize the V-phase claw poles 5*b* and the W-phase claw poles 5*c* to N poles, and to simultaneously magnetize the U-phase claw poles 5*a* to S poles.

Meanwhile, a magnetic flux generated by the current flowing through the second V-phase coil element 15*b* may be formed toward the V-phase core main body 20 or the U-phase core main body 19 from the W-phase core main body 21 to magnetize the V-phase claw poles 5*b* and the U-phase claw poles 5*a* to N poles, and to simultaneously magnetize the W-phase claw poles 5*c* to S poles.

Accordingly, the magnetic fluxes may be summed to magnetize the claw poles 5 of the V-phase core 9 to N poles, and to simultaneously magnetize the claw poles 5 of the U-phase core 8 and the claw poles 5 of the W-phase core 10 to S poles.

If the voltage is applied to the W-phase coil 16, the U-phase coil 14, and the V-phase coil 15, sequentially, the polarities of the claw poles 5 may change, so that the rotor 2 may rotate by an attractive force and a repulsive force generated between the claw poles 5 of the stator 3 and the permanent magnets 18 of the rotor 2.

A magnetic flux passing between the U-phase core main body 19 and the V-phase core main body 20 may pass through the UV gap G2, a magnetic flux passing between the V-phase core main body 20 and the W-phase core main body 21 may pass through the VW gap G3, and a magnetic flux passing between the U-phase core main body 19 and the W-phase core main body 21 may pass through the UW gap G1. That is, regardless of which core main body a magnetic flux passes between, the magnetic flux may pass through only one gap.

Also, since the voltage applied to the W-phase coil 16, the voltage applied to the U-phase coil 14, and the voltage applied to the V-phase coil 15 are the same, the voltage levels of the W-phase coil 16, the U-phase coil 14, and the V-phase coil 15 may be nearly the same Also, since the diameter of the V-phase coil 15, that is the diameters of the first V-phase coil element 15*a* and the second V-phase coil element 15*b* are greater than the diameter of the W-phase coil 16 and the diameter of the U-phase coil 14, the resistance of the U-phase coil 14, the resistance of the V-phase coil 15, and the resistance of the W-phase coil 16 may be nearly the same.

Accordingly, the amount of current flowing by the W-phase coil 16, the amount of current flowing by the U-phase coil 14, and the amount of current flowing by the V-phase coil 15 may become nearly the same, so that uniform current can flow through the respective cores.

Also, since two units 23 of the permanent magnets 18 of the rotor 2 correspond to the U-phase claw pole 5A, the V-phase claw pole 5*b*, and the W-phase claw pole 5*c* of the stator 3, the circumferential angle of the U-phase claw pole 5*a*, the V-phase claw pole 5*b*, and the W-phase claw pole 5*c* can increase to 240 degrees maximally. In the current embodiment, by setting the circumferential angle to 150 degrees, cogging torque and the distortion of magnetic flux interlinkage can be reduced, as shown in FIG. 8.

The claw pole type motor 1 according to the current embodiment configured as described above may have the following effects.

Since a magnetic flux passes through only one gap regardless of which core main body the magnetic flux passes between, magnetic resistance and an amount of magnetic flux can be balanced, thereby suppressing vibration or noise of the motor. Also since a magnetic flux passes through only one gap, a reduction of the amount of magnetic flux can be suppressed to the minimum level.

Also, since uniform current flows through the individual cores, it is possible to reduce the generation of torque ripple, and to prevent vibration or noise that makes rotation of the motor unstable.

Also, since the resistance of the V-phase coil 15 can be reduced by changing the diameters of the U-phase coil 14, the V-phase coil 15, and the W-phase coil 16 without changing the numbers of windings of the U-phase coil 14, the V-phase coil 15, and the W-phase coil 16, it is possible to equalize magnetic fluxes and to stabilize the rotation of the motor by using the U-phase coil 14, the V-phase coil 15, and the W-phase coil 16 of the same number of windings.

Also, in the current embodiment, the numbers of windings of the U-phase coil 14, the first V-phase coil element 15a, and the second V-phase coil element 15b, and the W-phase coil 16 are the same, however, the numbers of windings of the U-phase coil 14, the first V-phase coil element 15a, and the second V-phase coil element 15b, and the W-phase coil 16 may be different. In this case, although fabrication errors are generated in the axial direction in the U-phase core 8, the V-phase core 9, and the W-phase core 10, by changing the numbers of windings of the coils to adjust the resistance of the coils, non-uniformity of magnetic flux generated in the U-phase core 8, the V-phase core 9, and the W-phase core 10 due to fabrication errors can be eliminated.

A sum P of the numbers of the U-phase claw poles 5a, the V-phase claw poles 5b, and the W-phase claw poles 5c of the stator 3, and a sum S of the permanent magnets 18a magnetized to N poles and the permanent magnets 18b magnetized to S poles of the rotor 2 may have a relation of S:P=3:2(n+1). Accordingly, the U-phase claw pole 5a, the V-phase claw pole 5b, and the W-phase claw pole 5c of the stator 3, that is, three claw poles 5 may be disposed to correspond to a (n+1) unit 23 consisting of two permanent magnets 18a and 18b magnetized to N and S poles of the rotor 2 in the circumferential direction.

Since the circumferential angle of each unit 23 is 360 degrees, the circumferential angle of a sum of the U-phase claw pole 5a, the V-phase claw pole 5b, and the W-phase claw pole 5c may become 360×(n+1). Accordingly, since the circumferential angle of each claw pole 5 can become 120 degrees or more, cogging torque or the distortion of magnetic flux interlinkage can be reduced, thereby reducing vibration or noise of the motor.

In the current embodiment, by setting n to 1 in Equation (1) to set S:P to 3:4, the circumferential angle of the U-phase claw pole 5a, the V-phase claw pole 5b, and the W-phase claw pole 5c can increase to 240 degrees maximally. If the circumferential angle of the U-phase claw pole 5a, the V-phase claw pole 5b, and the W-phase claw pole 5c is set to 150 degrees, cogging torque and the distortion of magnetic flux interlinkage can be reduced, as shown in FIG. 18.

In the method of manufacturing the claw pole type motor 1 as described above, since the fore-ends of the center cylindrical member 12a and the center cylindrical member 12c of the U-phase core main body 19 and the W-phase core main body 21 disposed adjacent to each other in the axial line direction of the rotary shaft are pressed in and fixed, the fore-end of the center cylindrical member 12a may be compressed with the fore-end of the center cylindrical member 12c so as to prevent an air gap from being made between the center cylindrical member 12a and the center cylindrical member 12c. Accordingly, it is possible to reduce vibration or noise of the motor.

Also, since the positions of the widths in circumferential direction of the claw poles 5 are decided and fixed by the position deciding convex portions 39 formed in the lower die 32, the claw poles 5 may be arranged at equidistant intervals in the circumferential direction so that the motor can rotate smoothly, thereby reducing vibration or noise of the motor.

If each core is configured by pressing a magnetic material in a powder state in the axial line direction of the rotary shaft, air gaps may be hardly formed between the U-phase core main body 19 and the V-phase core main body 20 and between the V-phase core main body 20 and the W-phase core main body 21, since accuracy in dimension of the circumferential direction that is vertical to the axial line direction of the rotary shaft is significantly excellent rather than accuracy in dimension of the axial line direction of the rotary shaft. Also, since the U-phase core main body 19 and the W-phase core main body 21 are pressed in and fixed to each other, no air gap may be formed between the U-phase core main body 19 and the W-phase core main body 21, thereby reducing vibration or noise of the motor.

Also, since the plurality of parts constituting each core main body are divided n the shape of a concentric circle, it is easy to align the center axes of the parts when assembling the parts to fabricate the stator 3.

Accordingly, it is, possible to prevent rotation of the motor from being distorted due to deterioration in roundness of the claw poles 5 thereby reducing vibration or noise of the motor. Also, since the claw poles 5 are integrally arranged in the circumferential edge portion of the outermost one of the first parts, the claw poles 5 can be located when the first parts are located, so that the claw poles 5 can be easily located compared to the case of installing the parts and the claw poles 5 separately.

Also, a material used for forming the claw poles 5 may be different from a material used for forming the parts 41, 42, 43, 44 45, and 46. In this case, since high-priced insulation particles for insulating iron are used in only the claw poles 5, and a material that is different from the insulation particles for insulating iron can be used in the parts 41, 42, 43, 44, 45, and 46, manufacturing cost can be reduced.

Also, since the claw poles 5 are formed with a material having higher volume resistivity than a material forming the second parts 42, 44, and 46 to increase the electrical resistance of the claw poles 5, eddy current that is generated on the surfaces of the claw poles 5 can be reduced.

Also, since the second parts are configured by arranging three elements divided the diameter direction in the circumferential direction, electrical resistance may be generated between the elements, and eddy current flowing in the circumferential direction may be reduced by the electrical resistance.

In addition, since the external diameters of the second parts 42, 44, and 46 are greater than those of the U-phase coil 14, the V-phase coil 15 (the first V-phase coil element 15a and the second V-phase coil element 15b), and the W-phase coil 16, the stator 3 may be fabricated by fabricating the first part group, and then accommodating the first inner unit and the second inner unit therein, thereby improving assembling efficiency.

So far, the present disclosure has been described based on the specific embodiments, however, the present disclosure is not limited to the embodiments, and can be implemented by the equivalent or similar embodiments.

In the above-described embodiments, the stator is configured with the U-phase core, the V-phase core, the W-phase core, the U-phase coil, the V-phase coil, and the W-phase coil, however, the configuration of the stator is not limited to this, and the stator may be any stator configured with three cores.

Also, according to the above-described embodiments, a first core described in the claims is the U-phase core, a second core described in the claims is the V-phase core, and a third core described in the claims is the W-phase core, however, the first core, the second core, and the third core may correspond to any ones of the U-phase core, the V-phase core, and the W-phase core.

According to the above-described embodiments, a surrounding member described in the claims is the center cylindrical member, however the surrounding member is not limited to this. For example, one ends of the arms may be the surrounding portion. In this case, one ends of the arms arranged in the radial shape may be disposed close to or contact the circumferential surface of the center cylindrical bars the U-phase core and the W-phase core.

In the above-described embodiments, the depth in the axial line direction of the rotary shaft by which the fore-end portion of the center cylindric member of the U-phase core main body is inserted into the center cylindrical member of the V-phase core main body is equal to the depth in the axial line direction of the rotary shaft by which the fore-end portion of the center cylindrical member of the W-phase core main body is inserted into the center cylindrical member of the V-phase core main body, although not limited to this.

However, for example, the depth in the axial line direction of the rotary shaft by which the fore-end portion of the center cylindrical member of the U-phase core main body is inserted into the center cylindrical member of the V-phase core main body may be deeper or shallower than the depth in the axial line direction of the rotary shaft by which the fore-end portion of the center cylindrical member of the W-phase core main body is inserted into the center cylindrical member of the V-phase core main body.

Also for example, as shown in FIG. 12, concave portions having small external diameters may be formed in the end portions of the center cylindrical members of the U-phase core main body 51 and the W-phase core main body 53, and the center cylindrical member of the V-phase core main body 52 may be coupled with the concave portions of the U-phase core main body 51 and the W-phase core main body 53, thereby forming a second contact surface.

In the current embodiment, all the diameters of the first V-phase coil element and the second V-phase coil element are greater than those of the U-phase coil 14 and the W-phase coil 16, however, the diameter of any one of the first V-phase coil element and the second V-phase coil element may be greater than those of the U-phase coil 14 and the W-phase coil 16.

Also, in the current embodiment, the and of each claw pole of the stator is set to 120 degrees, however, the angle may change appropriately. In order to change the angle of each claw pole of the stator, the numbers and angles of claw poles included in the U-phase core, the V-phase core, and the W-phase core may change.

In the current embodiment, the first V-phase coil element and the U-phase coil are configured by winding separate wires around the first bobbin, however, the first V-phase coil element and the U-phase coil may be configured by winding the same wire around the first bobbin. Likewise, the second V-phase coil element and the W-phase coil are configured by winding separate wires around the second bobbin, however, the second V-phase coil element and the W-phase coil may be configured by winding the same wire around the second bobbin.

In the current embodiment, S:P is 3:4, however, other values may be used as long as they satisfy Equation (1). Also, the circumferential angle of each claw pole is not limited to 150 degrees, and may be any value within a range of 130 degrees to 160 degrees.

In the current embodiment, the resin layer is formed on the inner surfaces of the center cylindrical member 12*a* and the center cylindrical member 12*c*, however, the resin layer may be omitted.

However, a method of manufacturing the stator may be not limited to the above-described method. For example, the stator may be manufactured by fabricating the U-phase core main body, the V-phase core main body, and the W-phase core main body separately, disposing the U-phase coil and the first V-phase coil element between the U-phase core main body and the V-phase core main body, disposing the second V-phase coil element and the W-phase coil between the V-phase core main body and the W-phase core main body, and then fixing them.

Also, in the current embodiment, the claw poles and the parts are formed with different materials, however, the claw poles and the parts may be formed with the same material.

Also, in the current embodiment, permanent magnets are used as the magnetic poles of the rotor, however, the magnetic poles of the rotor may be any other material. For example, the magnetic poles of the rotor may be electromagnets. That is, the magnetic poles of the rotor may be any material as long as it has polarity.

So far, the effects of the present disclosure have been described in detail through the embodiments with reference to the appended drawings, however, the present disclosure is not limited to the embodiments. That is, the present disclosure can be applied to the similar embodiments.

Hereinafter, home appliances including the claw pole type motor 1 according to an embodiment of the present disclosure will be described. In the following drawings, a refrigerator and an air conditioner will be described as home appliances including the claw pole type motor 1 according to an embodiment of the present disclosure, however, the claw pole type motor 1 may be applied to various other home appliances, as well as a refrigerator and an air conditioner.

FIG. 14 shows the inside of a refrigerator including the claw pole type motor 1 according to an embodiment of the present disclosure.

Referring to FIG. 14, the refrigerator including the claw pole type motor 1 according to an embodiment of the present disclosure may include a main body 110 forming the outer appearance of the refrigerator, storage rooms 121 and 122 to store storage objects, cooling apparatuses 161, 171, 181, 182, 182, 191, and 192 to cool the storage rooms 121 and 122, and temperature sensors 141, 142, and 143 to sense the temperatures of the storage rooms 121 and 122.

In the inside of the main body 110, the storage rooms 121 and 122 to store storage objects, and a duct (not shown) in which evaporators (will be described later) 191 and 192 are installed may be provided, and in the wall of the main body 110 in which the storage rooms 121 and 122 are formed, holes (not shown) for causing air cooled by the evaporators 191 and 192 to flow between the duct (not shown) and the storage rooms 121 and 122 may be formed.

The storage rooms 121 and 122 may be partitioned into left and right parts with an intermediate partition wall in between, wherein the left and right parts may be a freezing chamber 121 to freeze and store storage objects, and a refrigerating chamber 122 to refrigerate and store storage objects, and the front parts of the freezing chamber 121 and the refrigerating chamber 122 may open.

The freezing chamber 121 and the refrigerating chamber 122 may be opened and closed by doors 131 and 132, respectively. On the doors 131 and 132 of the refrigerator 100, an input device 111 and a display 112 which will be described later may be provided. In the storage rooms 121 and 122, the temperature sensors 141, 142, and 143 to sense the temperatures of the storage rooms 121 and 122 may be provided, and the temperature sensors 141, 142, and 143 may include a first temperature sensor 141 to sense the temperature of the freezing chamber 121, and a second temperature sensor 142 to sense the temperature of the refrigerating chamber 122. Also, the temperature sensors 141, 142, and 143 may further include an outside temperature sensor 143 disposed on the outer side of the refrigerator 100 and configured to sense the outside temperature of the refrigerator 100.

The temperature sensors 141, 142, and 143 may adopt a thermistor whose electrical resistance value changes depending on temperature.

Cooling fans 151 and 152 may cause air cooled by the evaporators 191 and 192 provided in the duct (not shown) to flow into the storage rooms 121 and 122.

The cooling apparatuses 161, 171, 181, 182, 191 and 192 may include a condenser 171 to condense a refrigerant in a gaseous state, expansion valves 181 and 182 to decompress the condensed refrigerant in a liquid state, the evaporators 191 and 192 to evaporate the decompressed refrigerant in the liquid state, and a compressor 161 to compress the evaporated refrigerant in the gaseous state. In the evaporators 191 and 192, the refrigerant may change from the liquid state to the gaseous state, and at this time, the refrigerant may absorb latent heat to cool the evaporators 191 and 192 and air around the evaporators 191 and 192.

The condenser 171 may be installed in a machine room (not shown) provided in the lower portion of the main body 110, or outside the main body 110, that is, on the rear plate of the refrigerator 100. If a refrigerant in a gaseous state passes through the condenser 171, the refrigerant in the gaseous state may change to a liquid state. When the refrigerant is condensed, the refrigerant may emit latent heat.

If the condenser 171 is installed in the machine room provided in the lower portion of the main body 110, the condenser 171 may be heated by latent heat emitted from the refrigerant. Accordingly, a radiating fan (not shown) for cooling the condenser 171 may be provided.

A liquid refrigerant condensed by the condenser 171 may be decompressed by the expansion valves 181 and 182. That is, the expansion valves 181 and 182 may decompress a liquid refrigerant of a high pressure to a pressure at which the refrigerant can be evaporated by the throttling effect.

The throttling effect means a phenomenon in which the pressure of fluid is reduced without any heat exchange with the outside when the fluid passes through a narrow flow path, such as a nozzle or an orifice.

Also, the expansion valves 181 and 182 may adjust the amount of refrigerant so that the refrigerant can absorb a sufficient amount of heat energy from the evaporators 191 and 192. Particularly, if the expansion values 181 and 182 are electronic expansion valves, the degree of opening and closing of the expansion valves 181 and 182 may be adjusted by a driver 220 according to the control of the controller 210 which will be described later.

The evaporators 191 and 192 may be disposed in the duct (not shown) installed in the inside space of the main body 110 to evaporate a liquid refrigerant of a low pressure decompressed by the expansion valves 181 and 182.

The refrigerant may absorb latent heat from the evaporators 191 and 192 when it is evaporated, and the evaporators 191 and 192 lost heat energy to the refrigerant may cool air around the evaporators 191 and 192.

The gaseous refrigerant of the low pressure evaporated by the evaporators 191 and 192 may be again transferred to the compressor 61, thereby repeating the cooling cycle.

The compressor 150 may be installed in the machine room (not shown) provided in the lower portion of the main body 110. The compressor 150 may compress the gaseous refrigerant of the low pressure evaporated by the evaporators 191 and 192 using a rotation force of the motor, and transfer the compressed refrigerant to the condenser 171. The refrigerant may circulate through the condenser 171, the expansion valves 181 and 182 and the evaporators 191 and 192, due to the pressure generated by the compressor 150.

The compressor 150 of the refrigerator 100 according to an embodiment of the present disclosure may include a motor. The compressor 150 may include various kinds of motors. The claw pole type motor 1 according to the present disclosure may be included in the compressor 150, and function as a motor. The claw pole type motor 1 is widely used in refrigerators due to its compact size and high efficiency.

FIG. 15 shows the outer appearance of an air conditioner including a claw pole type motor according to an embodiment of the present disclosure, and FIG. 16 shows the inside of the air conditioner including the claw pole type motor according to an embodiment of the present disclosure.

Referring to FIG. 15, the air conditioner may include an outdoor unit 200 installed in outdoor space and configured to perform heat exchange between outside air and a refrigerant, and an indoor unit 300 installed in indoor space and configured to perform heat exchange between indoor air and a refrigerant.

The outdoor unit 200 may include an outdoor unit main body 210 forming the outer appearance of the outdoor unit 200, and an outdoor unit outlet 211 disposed in one side of the outdoor unit main body 210 and configured to discharge heat-exchanged air.

The indoor unit 300 may include an indoor unit main body 310 forming the outer appearance of the indoor unit 300, an indoor unit outlet 311 disposed in the front part of the indoor unit main body 310 and configured to discharge heat-exchanged air, a manipulation panel 312 to receive operation commands for the air conditioner from a user, and a display panel 313 to display operation information of the air conditioner.

Referring to FIG. 16, the air conditioner may include the outdoor unit 200, the indoor unit 300, a gas pipe P1 connecting the outdoor unit 200 to the indoor unit 300 and functioning as a passage through which a refrigerant in a gaseous state flows, and a liquid pipe P2 functioning as a passage through which a refrigerant in a liquid state passes, wherein the gas pipe P1 and the liquid pipe P2 extend to the insides of the indoor unit 200 and the outdoor unit 300.

The outdoor unit 200 may include a compressor 400 to compress a refrigerant, a heat exchanger 222 to perform heat exchange between outdoor air and a refrigerant, a 4-way valve 223 to selectively guide a refrigerant compressed by the compressor 210 to any one of the outdoor heat exchanger 222 and the indoor unit 300 according to a heating or cooling mode, an outdoor expansion valve 224 to decompress a refrigerant guided to the outdoor heat exchanger 222 in the heating mode, and an accumulator 225 to prevent a refrigerant in a liquid state not yet evaporated from entering the compressor 400.

The compressor 400 may compress a gaseous refrigerant of a low pressure to a high pressure using a rotation force of a compressor motor 1 that rotates by receiving electrical energy from an external power source. The compressor 400 may use various kinds of motors, and the claw pole type motor 1 according to the present disclosure may also be used as a motor for the compressor 400. The claw pole type motor 1 is widely used in refrigerators due to its compact size and high efficiency.

So far, the refrigerator including the claw pole type motor 1 and the conditioner including the claw pole type motor 1 have been described.

Hereinafter, the effects of the claw pole type motor 1 according to the current embodiment will be compared to the effects of a typical claw pole type motor.

FIG. 17 shows the waveforms of alternating current generated when current flows through coils.

As shown in FIG. 17(*a*), in the typical claw pole type motor, since a magnetic flux between a V-phase core and a U-phase core or a W-phase core, passing one contact surface between the cores, is greater than a magnetic flux between the U-phase core and the W-phase core, passing two contact surfaces between the cores, the amplitude of the waveform of alternating current generated by the V-phase coil is greater by about 25% than those generated by the other coils. Also, the phase of the waveform of alternating current generated by the U-phase coil and the W-phase coil is distorted by 8 degrees.

In regard of this, as shown its FIG. 17(*b*), in the claw pole type motor according to the current embodiment, since a magnetic flux passes through one contact surface regardless of which core the magnetic flux passes between, a uniform amount of magnetic flux care be generated, an increase in amplitude of the waveform of alternating current generated by the V-phase core may be suppressed to about 5%, and also a phase difference of the waveforms of alternating current generated by the U-phase core and the W-phase core may be suppressed to 2%.

Also, cogging torque measured when rotating the rotor without making current flow through the coils in the claw pole type motor 1 according to the current embodiment and the typical claw pole type motor is shown in FIG. 18.

As shown in FIG. 18, in the typical claw pole type motor, cogging torque is generated in a range of −0.0009 Nm to 0.0009 Nm, whereas in the claw pole type motor according to the current embodiment, cogging torque is generated in a range of −0.0002 Nm to 0.0002 Nm. Accordingly, the claw pole type motor 1 according to the current embodiment can reduce cogging torque to about ¼ compared to the typical claw pole type motor.

Since the claw pole type motor 1 according to the current embodiment can acquire a uniform amount of magnetic flux compared to the typical claw pole type motor, the claw pole type motor 1 according to the current embodiment can reduce cogging torque.

Finally, the relationship between a change of coil diameter and vibration of a claw pole type motor will be described. FIG. 19 is a graph showing the relationship of torque ripple with respect to rotor position in a typical claw pole type motor, FIG. 20 is a graph showing the relationship of torque ripple with respect to rotor position in a claw pole type motor according to an embodiment of the present disclosure, and FIG. 21 is a graph showing the relationship of cogging torque with respect to circumferential angles of claw poles in a claw pole type motor according to an embodiment of the present disclosure.

More specifically, torque ripple of the claw pole type motor 1 according to the current embodiment in which the diameters of the first V-phase coil element and the second V-phase coil element are greater than those of the U-phase coil and the W-phase coil, and torque ripple of a typical claw pole type motor in which the diameters of the first V-phase coil element and the second V-phase coil element are equal to those of the U-phase coil and the W-phase coil were measured.

The measurement results of the test are shown in the graphs of FIGS. 19 and 20. In the graphs, the vertical, axis represents torque, and the horizontal axis represents the phase position of the motor.

As shown in FIG. 19, in the typical claw pole type motor, since the maximum value of torque is 6.2 mNm, and the minimum value of torque is 4.6 mNm, torque ripple corresponding to the difference is about 1.6 mNm.

Meanwhile, as shown in FIG. 20 in the claw pole type motor 1 according to the current embodiment, since the maximum value of torque is 7.8 mNm, and the minimum value of torque is 7.4 mNm, torque ripple corresponding to the difference is about 0.4 mNm.

Accordingly, the claw pole type motor 1 according to the current embodiment can reduce torque ripple by about 27% compared to the typical claw pole type motor. The reason is because uniform current can flow through the individual cores by reducing resistance differences between the coils of the U-phase core, the V-phase core, and the W-phase core.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A home appliance comprising:
 a claw pole type motor including:
  a first stator core including a first stator core main body disposed on a rotary shaft, a first elongation portion disposed in a center portion of the first stator core main body and extending in an axial line direction of the rotary shaft, and a plurality of first claw poles disposed in an edge portion of the first stator core main body and extending in the axial line direction of the rotary shaft;
  a second stator core including a second stator core main body disposed on the rotary shaft, and a plurality of second claw poles disposed in an edge portion of the second stator core main body and extending in the axial line direction of the rotary shaft; and
  a third stator core including a third stator core main body disposed on the rotary shaft, a second elongation portion disposed in a center portion of the third stator core main body and extending in the axial line direction of the rotary shaft, and a plurality of third claw poles disposed in an edge portion of the third stator core main body and extending in the axial line direction of the rotary shaft, wherein the first elongation portion and the second elongation portion are in line with each other along the axial line direction of the rotary shaft, and the second stator core further comprises a surrounding member disposed in a center portion of the second stator core main body and surrounding the first elongation portion and the second elongation portion.

2. The home appliance according to claim 1, wherein a length of the first elongation portion surrounded by the surrounding member is equal to a length of the second elongation portion surrounded by the surrounding member.

3. The home appliance according to claim 1, wherein the surrounding member, the first elongation portion, and the second elongation portion are in a shape of a cylinder having a center hole.

4. The home appliance according to claim 3, wherein an internal diameter and an external diameter of the first elongation portion are respectively equal to an internal diameter and an external diameter of the second elongation portion, and the first elongation portion and the second elongation portion are inserted in the center hole of the shape of the cylinder of the surrounding member.

5. The home appliance according to claim 1, wherein the first stator core, the stator second core, and the third stator core are formed by pressing a magnetic material in a powder state in the axial line direction of the rotary shaft.

6. The home appliance according to claim 1, wherein
the first stator core is a U-phase core including a plurality of U-phase claw poles extending in the axial line direction of the rotary shaft from the first stator core main body,
the second stator core is a V-phase core including a plurality of V-phase claw poles extending in the axial line direction of the rotary shaft from the second stator core main body, and
the third stator core is a W-phase core including a plurality of W-phase claw poles extending in the axial line direction of the rotary shaft from the third stator core main body.

7. The home appliance according to claim 6, wherein
the U-phase core, the V-phase core, and the W-phase core further comprise a U-phase coil, a V-phase coil, and a W-phase coil to magnetize the U-phase core, the V-phase core, and the W-phase core, respectively,
the U-phase coil is disposed between the U phase first stator core main body and the second stator core main body, the W-phase coil is disposed between the second stator core main body and the third stator core main body, and
the V-phase coil includes a first V-phase coil element disposed between the first stator core main body and the second stator core main body, and a second V-phase coil element disposed between the second stator core main body and the third stator core main body, wherein the first V-phase coil element is connected in series to the second V-phase coil element.

8. The home appliance according to claim 7, wherein
the first V-phase coil element is disposed in an outside of the U-phase coil;
the second V-phase coil element is disposed in an outside of the W-phase coil;
a diameter of the first V-phase coil element and a diameter of the second V-phase coil element are greater than a diameter of the U-phase coil and a diameter of the W-phase coil.

9. The home appliance according to claim 7, wherein
the first V-phase coil element is disposed in an inside of the U-phase coil,
the second V-phase coil element is disposed in an inside of the W-phase coil, and
the diameters of the first V-phase coil element and the second V-phase coil element are smaller than the diameters of the U-phase coil and the W-phase coil.

10. The home appliance according to claim 7, wherein a ratio of a diameter of the first V-phase coil element or the second V-phase coil element with respect to a diameter of the U-phase coil or the W-phase coil is within a range of 1.0 to 1.4.

11. The home appliance according to claim 7, wherein a number of windings of the first V-phase coil element and the second V-phase coil element are different from a number of windings of the U-phase coil and the W-phase coil.

12. The home appliance according to claim 7, wherein
the U-phase claw poles, the V-phase claw poles, and the W-phase claw poles are arranged in an order of the U-phase claw poles, the V-phase claw poles, and W-phase claw poles such that a group of a U-phase claw pole, a V-phase claw pole, and a W-phase claw pole appears repeatedly in a circumferential direction,
the claw pole type motor further comprising a rotor in which a plurality of N poles and S poles are alternately arranged in the circumferential direction in correspondence to the U-phase claw poles, the V-phase claw poles, and the W-phase claw poles.

13. The home appliance according to claim 7, further comprising:
a rotor, wherein
a sum of the U-phase claw poles, the V-phase claw poles, and the W-phase claw poles is S,
a sum of the N and S poles of the rotor is P, and
a ratio of S to P satisfies Equation (1), $$S:P=3:2(n+1) \qquad \text{Equation (1)}$$

(n+1)≠3m, wherein n and m are integers.

14. The home appliance according to claim 7, wherein a circumferential angle of each claw pole is an angle within a range of 130 degrees to 160 degrees, as an electrical angle.

15. A claw pole type motor comprising:
a first stator core including a first stator core main body disposed on a rotary shaft, a first elongation portion disposed in a center portion of the first stator core main body and extending in an axial line direction of the rotary shaft, and a plurality of first claw poles disposed in an edge portion of the first stator core main body and extending in the axial line direction of the rotary shaft;
a second stator core including a second stator core main body disposed on the rotary shaft, and a plurality of second claw poles disposed in an edge portion of the second stator core main body and extending in the axial line direction of the rotary shaft; and
a third stator core including a third stator core main body disposed on the rotary shaft, a second elongation portion disposed in a center portion of the third stator core main body and extending in the axial line direction of the rotary shaft, and a plurality of third claw poles disposed in an edge portion of the third stator core main body and extending in the axial line direction of the rotary shaft,
wherein the first elongation portion and the second elongation portion are in line with each other along the axial line direction of the rotary shaft, and the second stator core further comprises a surrounding member disposed in a center portion of the second stator core main body and surrounding the first elongation portion and the second elongation portion.

16. The claw pole type motor according to claim 15, wherein a length of the first elongation portion surrounded by the surrounding member is equal to a length of the second elongation portion surrounded by the surrounding member.

17. The claw pole type motor according to claim 15, wherein the surrounding member, the first elongation portion, and the second elongation portion are in a shape of a cylinder having a center hole.

18. The claw pole type motor according to claim 17, wherein an internal diameter and an external diameter of the first elongation portion are respectively equal to an internal diameter and an external diameter of the second elongation portion, and the first elongation portion and the second elongation portion are inserted in the center hole of the shape of the cylinder of the surrounding member.

19. The claw pole type motor according to claim 15, wherein the first stator core, the stator second core, and the third stator core are formed by pressing a magnetic material in a powder state in the axial line direction of the rotary shaft.

20. The claw pole type motor according to claim 15, wherein
- the first stator core is a U-phase core including a plurality of U-phase claw poles extending in the axial line direction of the rotary shaft from the first stator core main body,
- the second stator core is a V-phase core including a plurality of V-phase claw poles extending in the axial line direction of the rotary shaft from the second stator core main body, and
- the third stator core is a W-phase core including a plurality of W-phase claw poles extending in the axial line direction of the rotary shaft from the third stator core main body.

* * * * *